US009729219B2

(12) United States Patent
Chapman et al.

(10) Patent No.: US 9,729,219 B2
(45) Date of Patent: Aug. 8, 2017

(54) METHODS FOR SIGNALING AND USING BEAM FORMING QUALITY INDICATORS

(71) Applicant: Telefonaktiebolaget L M Ericsson (publ), Stockholm (SE)

(72) Inventors: Thomas Chapman, Solna (SE); Torbjörn Elfström, Fjärås (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 88 days.

(21) Appl. No.: 14/613,071

(22) Filed: Feb. 3, 2015

(65) Prior Publication Data

US 2015/0222345 A1 Aug. 6, 2015

Related U.S. Application Data

(60) Provisional application No. 61/936,444, filed on Feb. 6, 2014.

(51) Int. Cl.
| | |
|---|---|
| *H04B 7/06* | (2006.01) |
| *H04W 36/30* | (2009.01) |
| *H04W 36/08* | (2009.01) |
| *H04B 17/00* | (2015.01) |
| *H04W 36/00* | (2009.01) |

(52) U.S. Cl.
CPC ......... *H04B 7/0617* (2013.01); *H04B 7/0632* (2013.01); *H04B 17/00* (2013.01); *H04W 36/00* (2013.01); *H04W 36/08* (2013.01); *H04W 36/30* (2013.01)

(58) Field of Classification Search
CPC .............................. H04B 7/0617; H04W 36/30
See application file for complete search history.

(56) References Cited

U.S. PATENT DOCUMENTS

| | | | | |
|---|---|---|---|---|
| 5,471,670 | A * | 11/1995 | Hess ...................... | H04W 36/20 455/161.3 |
| 2012/0063417 | A1* | 3/2012 | Redana ................. | H04W 36/12 370/331 |
| 2013/0301454 | A1* | 11/2013 | Seol ....................... | H04B 7/043 370/252 |
| 2015/0010112 | A1* | 1/2015 | Liu ....................... | H04W 24/08 375/316 |

(Continued)

OTHER PUBLICATIONS

PCT Notification of Transmittal of the International Search Report and the Written Opinion of the International Searching Authority, or the Declaration for International application No. PCT/IB2015/050878, Aug. 6, 2015.

(Continued)

*Primary Examiner* — John Blanton
(74) *Attorney, Agent, or Firm* — Baker Botts, LLP

(57) ABSTRACT

A method in a node is disclosed. The method comprises determining a beam forming quality indicator for the network node, the beam forming quality indicator indicating a beam forming performance gain from the network node having beam forming capability, wherein the beam forming quality indicator comprises at least or is a function of at least a reference signal quality and an achievable signal quality. The method further comprises performing one or more radio operations using the determined beam forming quality indicator.

26 Claims, 13 Drawing Sheets

(56) References Cited

U.S. PATENT DOCUMENTS

2015/0230142 A1* 8/2015 Yang .................... H04W 36/00
370/331

OTHER PUBLICATIONS

3GPP TSG RAN WG1 Meeting #76; Prague, Czech Republic; Source: ASUSTek; Title: On the Use of Type 2B Discovery (R1-140292), Feb. 10-14, 2014.
3GPP TSG RAN WG1 Meeting #77; Seoul, Korea; Source: NTT DoCoMo, Inc.; Title: Discussion on Inter-cell Type 2B Discovery (R1-142268), May 19-23, 2014.
3GPP TSG RAN WG1 Meeting #76; Prague, Czech Republic; Source: ASUSTek; Title: Type 2B Discovery with Resource Hopping (R1-140293), Feb. 10-14, 2014.

* cited by examiner

METHODS FOR SIGNALING AND USING BEAM FORMING QUALITY INDICATORS

PRIORITY

This application claims the benefit under 35 U.S.C. §119(e) of the priority of U.S. Provisional Application 61/936,444 filed on Feb. 6, 2014, entitled "METHODS FOR SIGNALING AND USING BEAM FORMING QUALITY INDICATORS BY AN AAS BASE STATION," the entire disclosure of which is hereby incorporated by reference.

TECHNICAL FIELD

The present disclosure relates, in general, to wireless communications and, more particularly, to using beam forming quality indicator(s) by a network node in a wireless communication system.

BACKGROUND

So-called Active Antenna System (AAS) base stations (sometimes also referred to as Advanced Antenna System base stations) have become a topic of increasing interest in recent years. An AAS base station may have some or all of the electronic components of a radio frequency (RF) transceiver integrated with an antenna unit, and may have multiple transceiver chains. An AAS base station may have the ability to perform electronic beam forming on transmitted and received signals.

FIG. 1 illustrates a reference architecture for an AAS base station. More particularly, FIG. 1 illustrates various components of an AAS base station, including antenna array 10, radio distribution network (RDN) 15, radio transceiver array 20, and baseband processing unit 25.

Antenna array 10 may include any suitable antenna elements. For example, antenna array 10 may include any suitable number of antennas. Antenna array 10 may have any suitable arrangement. For example, there exist a number of potential physical arrangements for antenna array 10, which may include (but are not limited to) uniform linear, matrix and circular. Typically, cross polarized arrangements are deployed with an antenna element for each polarization.

RDN 15 may be responsible for routing of RF signals between each transceiver output and one or more antennas. In some cases, RDN 15 may be as simple as a direct coupling from each transceiver to each antenna. In other cases, RDN 15 may be a complex network of feeders and filters, with each transceiver driving multiple antenna elements.

Radio transceiver array 20 may include any suitable number of transceivers. Transceivers of radio transceiver array 20 may contain transmit chains and receive chains. Transmit chains may contain typical components such as filters, mixers, power amplifiers (Pas), and any other suitable components. Receive chains may contain typical components such as filtering, low noise amplifiers (LNAs), and any other suitable components. In some cases, the number of transmitters may not be equal to the number of receivers. Baseband processing unit 25 may perform the processing functions of the AAS reference architecture. In certain embodiments, baseband processing unit 25 may perform electronic beam forming.

As described above, AAS base stations may have the ability the ability to perform electronic beam forming on transmitted and received signals. Beam forming may be performed at various places within the architecture. For example, beam forming may be performed in baseband processing unit 25, or may be performed as part of the transceivers of transceiver array 20, or RDN 15 may implement analogue beam forming. There may be several approaches to beam forming, depending on the type of base station architecture and the intended application. Broadly speaking, beam forming types can be split into two categories: cell specific beam forming and user specific beam forming.

Cell specific beam forming is beam forming that is performed on signals that are common to all user equipments (UEs), in order to impact the footprint of a cell. Examples of cell specific beam forming include variable electronic downtilt, cell splitting, and cell shaping. In variable electronic downtilt beam forming, the elevation angle of the main lobe of the cell coverage beam is tilted downwards by means of electronic beam forming, typically to reduce downlink intercell interference. Downtilt is achievable using non AAS, passive antenna systems. AAS systems, however, offer new possibilities, such as varying the downtilt according to traffic conditions, and applying different degrees of downtilt to different carriers and radio access technologies (RATs).

In cell splitting, beam forming is used to create beams with different cell IDs. Cell splitting enables a more adaptive approach to increasing capacity. Cell splitting may also be applied differently on different carriers or RATs. In cell shaping, the coverage pattern of a cell is made irregular by means of beam forming. For example, cell shaping may be applied in heterogeneous networks to adjust the coverage area of a macrocell to avoid interference to a microcell.

User specific beam forming is beam forming that is applied only to resources scheduled for a particular user. User specific beam forming is typically dynamic and dependent on channel conditions and scheduler decisions. Examples of user specific beam forming include non-coherent beam forming, coherent beam forming, and uplink beam forming. Non-coherent beam forming refers to a situation in which the phase between multiple antennas is not predictable. Typically, in the downlink the UE will send feedback information to the base station relating to the instantaneous receive signal conditions from the beam forming antennas, such that the base station can apply instantaneously optimal beam forming. Non-coherent beam forming may be used to achieve spatial multiplexing of multiple streams to a single user, or multiple streams to multiple users.

In coherent beam forming, the difference in phase that the UE experiences from different antennas is constant and known in the base station. By means of applying a so-called "phase progression" (and optionally, amplitude weights) to the signal transmitted to each antenna, a base station can create a narrow beam width beam that is directed towards a specific user. This will both increase the received signal to the user in question and decrease interference to other users. Coherent beam forming can be used to spatially multiplex streams to different users that are geographically separated. Uplink beam forming typically aims to maximize receiver SINR for an uplink user by means of maximizing combining gain for the signal from the user in question whilst steering spatial nulls towards significant sources of interference.

FIG. 2 illustrates the difference between user specific beam forming and cell specific beam forming. More particularly, FIG. 2 illustrates a plurality of UEs 110A, 110B, 110C, network node 115, and a plurality of coverage areas 130, 140, 150A, 150B. UEs 110A-C may be any suitable wireless device, and may communicate with network node 115 over a wireless interface. For example, UE 110A may transmit wireless signals to network node 115 and/or receive wireless signals from network node 115. The wireless signals may contain voice traffic, data traffic, control signals, and/or any other suitable information. In some embodiments, an area of wireless signal coverage associated with a network node 115 may be referred to as a cell.

Network node 115 may have the ability to perform electronic beam forming. For example, network node 115 may be an AAS base station. Network node 115 may interface with one or more components of a network. For example, network node 115 may interface with a radio network controller. The radio network controller may control network node 115 and may provide certain radio resource management functions, mobility management functions, and/or other suitable functions. The radio network controller may interface with a core network node. In certain embodiments, the radio network controller may interface with a core network node via an interconnecting network. The interconnecting network may refer to any interconnecting system capable of transmitting audio, video, signals, data, messages, or any combination of the preceding.

In some embodiments, the core network node may manage the establishment of communication sessions and various other functionality for UEs 110A, 110B, and 110C. UEs 110 may exchange certain signals with the core network node using the non-access stratum layer. In non-access stratum signaling, signals between UEs 110 and the core network node may be transparently passed through a radio access network. Example embodiments of UEs 110, network node 115, and other network nodes (such as the radio network controller or core network node) are described with respect to FIGS. 11, 12, and 13, respectively.

UEs 110A-C may transmit wireless signals to network node 115 and/or receive wireless signals from network node 115. Coverage areas 130, 140, 150A and 150B illustrate the coverage areas in which UEs 110A-C may transmit and/or receive wireless signals from network node 115. For example, coverage area 130 illustrates the coverage of physical antenna elements of network node 115. In some cases, the size of coverage area 130 may be larger than the area intended to be covered by network node 115. Furthermore, coverage area 130 may result in interference. Coverage area 140 illustrates the coverage area of cell-specific beams. Coverage area 140 may represent the area in which UEs 110A-C may detect network node 115, and perform radio measurements. Coverage areas 150A and 150B illustrate the coverage of UE specific beams. For example, coverage area 150A may be a UE specific beam for UE 110A. Similarly, coverage area 150B may be a UE specific beam for UE 110B.

There exist a variety of deployment strategies for AAS base stations. One is a typical macro deployment in which the above mentioned beam forming techniques can be used for improving capacity (e.g., by means of spatial multiplexing), reducing interference (e.g., by means of variable downtilt), or enabling offloading between cells (e.g., by means of using user specific beam forming to improve SINR when trying to serve users located in neighbor cells).

FIG. 3 illustrates a scenario in which user specific beam forming is used for macro offloading. More particularly, FIG. 3 illustrates a plurality of cells 310A-G. Each cell 310 may have an associated coverage area, and may include one or more network nodes, such as network node 115 described above. For example, cell 310C may be a macro cell having a macro node. Some of the one or more network nodes associated with each cell 310 may be AAS capable network nodes, and therefore may be able to perform electronic beam forming. For example, cell 310G may include an AAS capable network node.

A UE, such as UE 110A, may be located within one of the cells, such as cell 310C. Normally, UE 110A located in cell 310C would be served by a network node in cell 310C. In certain circumstances, however, the cell in which UE 110a is located may be overloaded. In such circumstances, a neighboring cell, such as cell 310G, may have additional capacity, and may include an AAS capable network node. The AAS capable network node of cell 310G, therefore, may be able to perform user specific beam forming to UE 110A, despite UE 110A being located in cell 310C. In such circumstances, UE 110A may be handed over to cell 310G, which has additional capacity. As a result, the load on cell 310C may be decreased.

AAS is also an interesting technology for deployment in so called heterogeneous networks. In heterogeneous networks either macro calls, or small cells (e.g., femto cell, pico cell, micro cell, etc.), or both may contain AAS base stations. One scenario that is of particular interest is that of a heterogeneous network in which the small cells (e.g., medium range or micro Node Bs or eNode B) are deployed to offload traffic from the macro network. In such situations, it may be the case that it is beneficial to serve some UEs from a small base station, even though they are far enough away from it that the macro node has the strongest receive signal (e.g. RSRP, RSRQ, CPICH Ec/Io, CPICH RSCP). In general, although these UEs will experience poorer instantaneous throughput due to interference from the macro cell, offloading them may enable the low power node (LPN) to serve the UEs more often, thus increasing their mean throughput whilst further offloading the macro cell.

FIG. 4 illustrates a scenario in a heterogeneous deployment. More particularly, FIG. 4 illustrates a macro node 115A and a LPN 115B. As described above, in a heterogeneous network a UE outside of a traditional cell coverage area of a low power node may be served by the low power node. Coverage area 400 illustrates the coverage area associated with macro node 115A. Coverage area 410 illustrates the traditional coverage area of LPN 115B. Coverage area 420 illustrates the coverage area that can be achieved at LPN 115B using cell range extension or cell range expansion (CRE). One reason that CRE may be deployed is that, due to different transmit (TX) power for macro node 115A and LPN 115B, at the LPN cell border the uplink (UL) path loss to LPN 115B is much lower than that to macro node 115A even though the downlink (DL) receive signal levels are similar. In such a case, it may be preferable to serve a UE, such as UE 110 described above, from LPN 115B so that UL power control can be performed from LPN 115B. Another reason is that at least some of the load of macro node 115A can be offloaded to LPN 115B. This may result in better overall throughput.

FIG. 5 illustrates low power node cell range extension due to unequal uplink path loss. Normal cell border 510 illustrates the typical cell border based on the DL. Extended cell border 520 illustrates the extended cell border based on UL when cell range extension is used. In certain circumstances, a UE operating within the scenario illustrated in FIG. 5 may be served by macro node 115A. Such a UE may need to transmit to macro node 115A, which may result in interference in the UL to LPN 115B. In order to minimize the interference, the UE may be served at LPN 115B to the extended cell border based on UL.

AAS has the potential to improve the performance of scenarios in which cell range extension is performed. For example, user specific beam forming can be used to increase the SINR for UEs within the cell range extension zone whilst not increasing the interference observed by other users in the system.

Generally, a UE, such as UE 110 described above, may be handed to an LPN, such as LPN 115B described above, in a cell range extension zone when it is in an active connected state such as long term evolution (LTE) ACTIVE mode or high speed packet access (HSPA) CELL_DCH state. In order to make a decision to hand over the UE to an LPN or macro, a radio resource control (RRC) or radio resource management (RRM) unit will take into account measurement reports from the UE. The UE reported measurement results may be a measurement result or an event, which in turn is triggered by the UE based on the measurement result and one or more thresholds. For LTE, measurement reports may relate to common reference symbol (CRS) based reference signal received power (RSRP) or CRS based reference signal received quality (RSRQ). For HSPA, measurement reports may relate to common pilot channel (CPICH) based received signal code power (RSCP) or CPICH based chip energy to noise ratio (Ec/No). In either case, the measurements are made on fixed power, cell wide pilots or reference signals transmitted by the LPN that do not experience user specific beam forming.

Thus, decisions on handover when the UE is in an active state may be made based on measurement reports from the UE that are made on the cell wide pilot. In traditional passive antenna systems, the amount of antenna gain experienced by the cell wide pilot is the same as the antenna gain experienced with user specific signals. With AAS systems that are capable of user specific beam forming, however, user specific beams may experience a higher effective antenna gain than the common signals, such as the RS/CRS/pilots. Thus, when considering handing over users to an LPN or another macro cell for offloading, RRM will tend to underestimate the achievable throughput and offloading. This will lead to suboptimal usage of radio resources, since in some circumstances a UE would not be offloaded to another cell due to poor RS/CRS/pilot based measurements, even though with user specific beam forming an acceptable user throughput could be achieved from the other cell. Since the user specific beam forming gain is specific to the AAS architecture and application, it is not predictable for the source base station to guess the potential user specific beam forming gain offered by another base station.

SUMMARY

To address the foregoing problems with existing solutions, disclosed is a method in a network node. The method comprises determining a beam forming quality indicator for the network node, the beam forming quality indicator indicating a beam forming performance gain from the network node having beam forming capability, wherein the beam forming quality indicator comprises at least or is a function of at least a reference signal quality and an achievable signal quality. The method further comprises performing one or more radio operations using the determined beam forming quality indicator.

In certain embodiments, the reference signal quality may be a signal quality measurement on a pilot or reference signal not using beam forming. The achievable signal quality may be a signal quality that can be achieved on a signal with a user specific beam by the network node using beam forming. The function of the reference signal quality and the achievable signal quality may be a difference between the achievable signal quality and the reference signal quality. The function defining the beam forming quality indicator may further comprise one or more of one or more multi-antenna configuration parameters, one or more characteristics of a beam, one or more characteristics of a radiation pattern, and a frequency band or range of frequencies.

Performing one or more radio operations using the determined beam forming quality indicator may comprise one or more of communicating the determined beam forming quality indicator to a second network node, communicating the determined beam forming quality indicator to a user equipment, and storing the beam forming quality indicator. The method may comprise updating the determined beam forming quality indicator on a periodic basis. The method may comprise determining that one or more network node radio configuration parameters have changed, and updating the determined beam forming quality indicator upon determining that one or more network node radio configuration parameters have changed. The method may comprise receiving capability information from a user equipment. The capability information may include information about an ability of the user equipment to use the beam forming quality indicator for one or more radio operations. The method may comprise determining whether to communicate the determined beam forming quality indicator to the user equipment based at least in part on the received capability information.

Also disclosed is a network node. The network node comprises one or more processors. The one or more processors are configured to determine a beam forming quality indicator for the network node, the beam forming quality indicator indicating a beam forming performance gain from the network node having beam forming capability, wherein the beam forming quality indicator comprises at least or is a function of at least a reference signal quality and an achievable signal quality. The one or more processors are configured to perform one or more radio operations using the determined beam forming quality indicator.

Also disclosed is a method in a network node. The method comprises obtaining a beam forming quality indicator for a second network node, the beam forming quality indicator indicating a beam forming performance gain from the second network node having beam forming capability, wherein the beam forming quality indicator comprises at least or is a function of at least a reference signal quality and an achievable signal quality. The method further comprises performing one or more radio operations based at least in part on the obtained beam forming quality indicator for the second network node.

In certain embodiments, the function defining the beam forming quality indicator may further comprise one or more of one or more multi-antenna configuration parameters, one or more characteristics of a beam, one or more characteristics of a radiation pattern, and a frequency band or range of frequencies. Obtaining the beam forming quality indicator for the second network node may comprise receiving the beam forming quality indicator for the second network node from the second network node. Obtaining the beam forming quality indicator for the second network node may comprise autonomously determining the beam forming quality indicator for the second network node. In certain embodiments, the network node may be serving a user equipment, and performing one or more radio operations based at least in part on the obtained beam forming quality indicator for the second network node may comprise determining, based at least in part on the obtained beam forming quality indicator, that the second network node can provide better beam forming gain than a third network node, the third network node having a higher reference signal received quality than the second network node, and performing cell change of the user equipment to the second network node. The beam forming quality indicator may be a first beam forming quality indicator, the first beam forming quality indicator corresponding to a first beam forming configuration, and the method may further comprise obtaining a second beam forming quality indicator, the second beam forming quality indicator corresponding to a second beam forming configuration. The first beam forming configuration and the second beam forming configuration may be selected from a group including beam forming in uplink, beam forming in downlink, elevation beam forming in uplink or downlink, and ground level beam forming in the uplink or downlink.

Also disclosed is a network node. The network node comprises one or more processors. The one or more processors are configured to obtain a beam forming quality indicator for a second network node, the beam forming quality indicator indicating a beam forming performance gain from the second network node having beam forming capability, wherein the beam forming quality indicator comprises at least or is a function of at least a reference signal quality and an achievable signal quality. The one or more processors are configured to perform one or more radio operations based at least in part on the obtained beam forming quality indicator for the second network node.

Also disclosed is a method in a user equipment. The method comprises obtaining a beam forming quality indicator for a first network node, the beam forming quality indicator indicating a beam forming performance gain from the first network node having beam forming capability, wherein the beam forming quality indicator comprises at least or is a function of at least a reference signal quality and an achievable signal quality. The method further comprises performing one or more radio operations based at least in part on the obtained beam forming quality indicator for the first network node.

In certain embodiments, the function defining the beam forming quality indicator may further comprise one or more of one or more multi-antenna configuration parameters, one or more characteristics of a beam, one or more characteristics of a radiation pattern, and a frequency band or range of frequencies. Performing one or more radio operations based at least in part on the obtained beam forming quality indicator for the first network node may comprise modifying one or more measurement reports based at least in part on the obtained beam forming quality indicator. The method may comprise reporting the modified measurement report to one or more network nodes. In certain embodiments, the method may comprise determining whether the beam forming performance gain indicated by the beam forming quality indicator exceeds a threshold, and reporting the modified measurement report to one or more network nodes upon a determination that the beam forming performance gain indicated by the beam forming quality indicator exceeds the threshold. The one or more measurement reports may include one or more of reference signal received power and reference signal received quality.

In certain embodiments, performing one or more radio operations based at least in part on the obtained beam forming quality indicator for the first network node may comprise using the obtained beam forming quality indicator for one or more cell change procedures. The one or more cell change procedures may comprise cell reselection, and the method may further comprise determining one or more reference signal measurements for the first network node, modifying the one or more reference signal measurements based at least in part on the beam forming quality indicator for the first network node, and reselecting, upon entering an area of a cell in which beam forming by the first network node would provide downlink throughput levels corresponding to a cell range extension zone, the first network node without a handover from a second network node. In certain embodiments, the one or more cell change procedures may comprise cell reselection, and the method may further comprise determining the beam forming performance gain indicated by the beam forming quality indicator for the first network node, and selecting a cell having a beam forming performance gain above a threshold. The method may further comprise communicating capability information to one or more network nodes, the capability information indicating an ability of the user equipment to use the beam forming quality indicator to perform one or more radio operations.

In certain embodiments, the first network node may be serving the user equipment, and the method may further comprise obtaining a beam forming quality indicator for at least a second network node, the beam forming quality indicator for the second network node larger than the beam forming quality indicator for the first network node by at least a beam forming quality indicator threshold. The method may further comprise determining, based at least in part on the obtained beam forming quality indicators for the first and second network nodes, that the second network node can provide better beam forming performance gain than the first network node, and performing cell change of the user equipment from the first network node to the second network node.

Also disclosed is a user equipment. The user equipment comprises one or more processors. The one or more processors are configured to obtain a beam forming quality indicator for a first network node, the beam forming quality indicator indicating a beam forming performance gain from the first network node having beam forming capability, wherein the beam forming quality indicator comprises at least or is a function of at least a reference signal quality and an achievable signal quality. The one or more processors are configured to perform one or more radio operations based at least in part on the obtained beam forming quality indicator for the first network node.

Certain embodiments of the present disclosure may provide one or more technical advantages. As one example, certain embodiments may result in more accurate cell change (e.g., handover) decisions, and in particular decisions relating to cell offloading may be more accurate. As another example, in heterogeneous networks, certain embodiments may enable larger cell range extension zones, allowing greater offloading to be realized. As yet another example, certain embodiments may enhance the cell reselection procedure performed by the UE and the UE measurement procedure. Furthermore, in certain embodiments, the UE may not have to do a handover immediately after going into connected state, since cell reselection and measurement done by the UE may take into account the electronic beam forming capability of network nodes when performing such procedures.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, radio resources in a network including network nodes capable of performing electronic beam forming may not be optimally utilized when the potential gains offered by such network nodes are not taken into account in certain procedures, such as cell reselection and handover. The present disclosure contemplates various embodiments using a beam forming quality indicator that may address these and other deficiencies of existing implementations.

Figure 1:
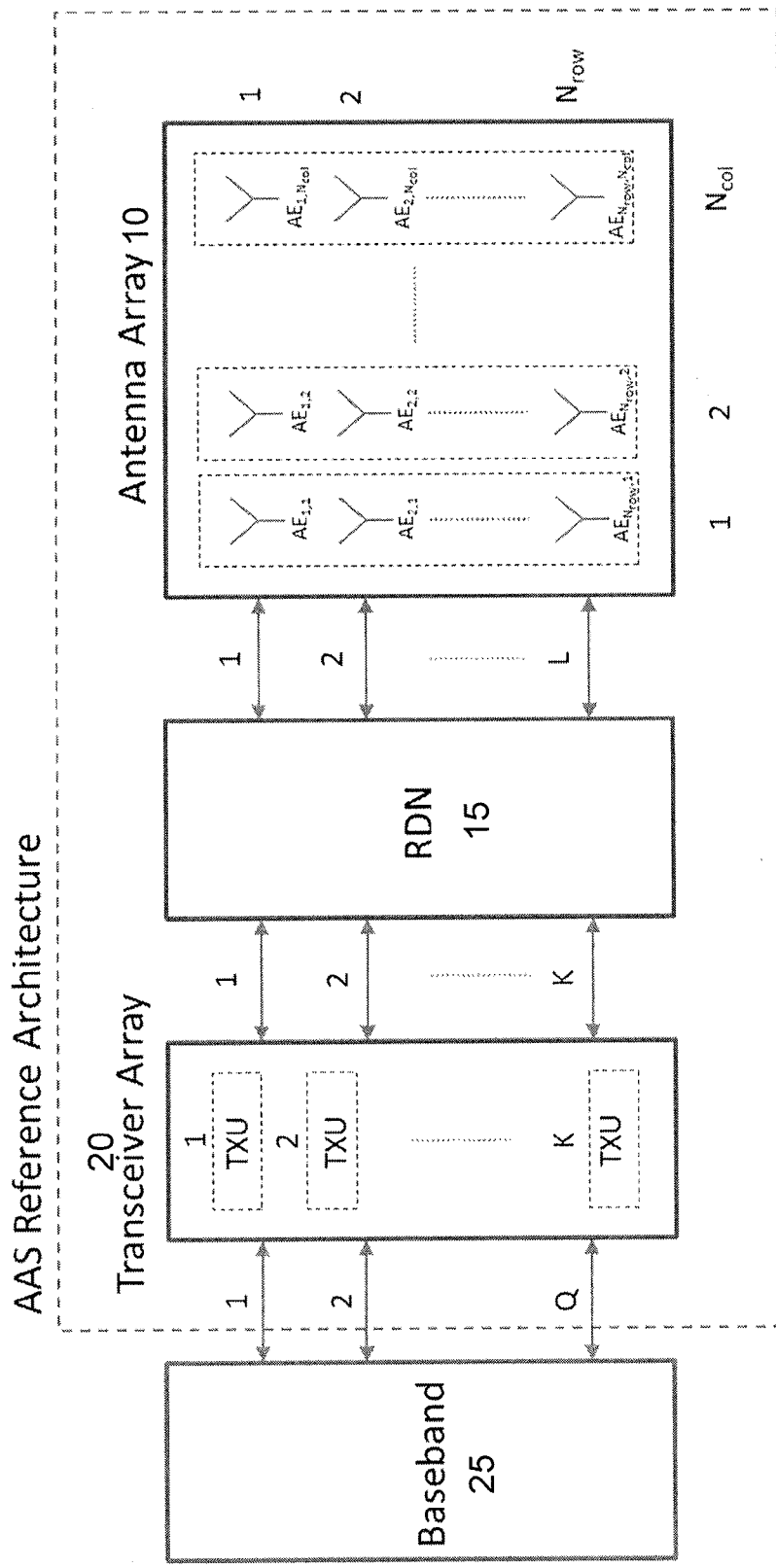
FIG. 1 illustrates a reference architecture for an AAS base station.
Figure 2:
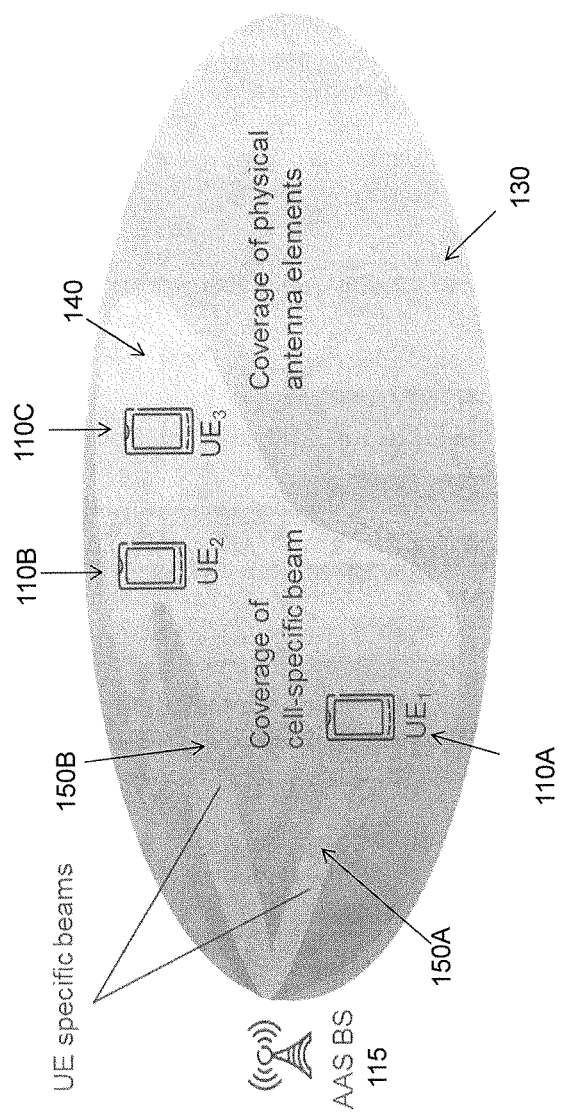
FIG. 2 illustrates the difference between user specific beam forming and cell specific beam forming.
Figure 3:
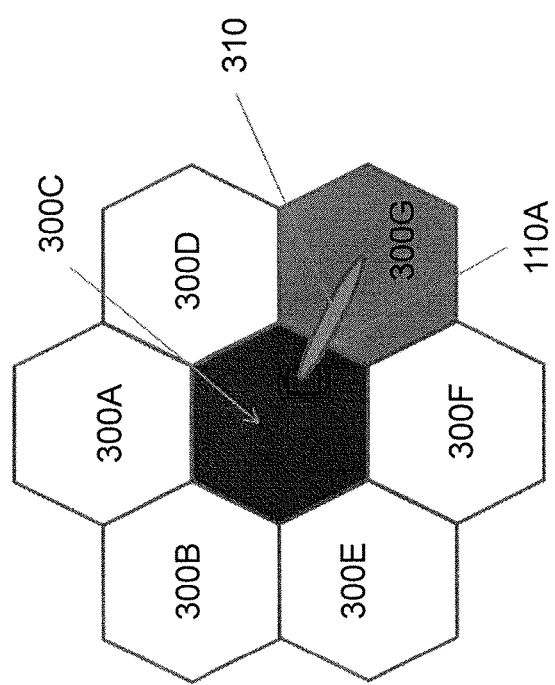
FIG. 3 illustrates a scenario in which user specific beam forming is used for macro offloading.
Figure 4:
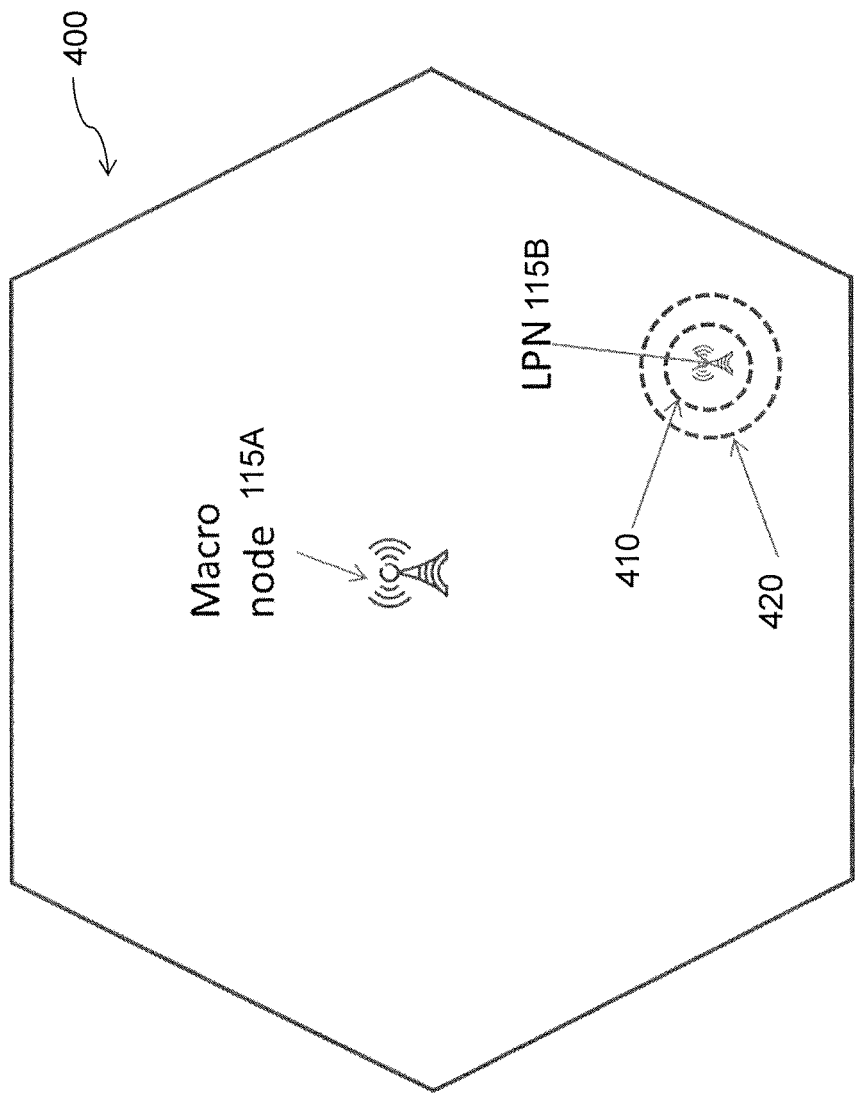
FIG. 4 illustrates a scenario in a heterogeneous deployment in which UEs that are outside of a traditional cell coverage area of a low power node are served by the low power node.
Figure 5:
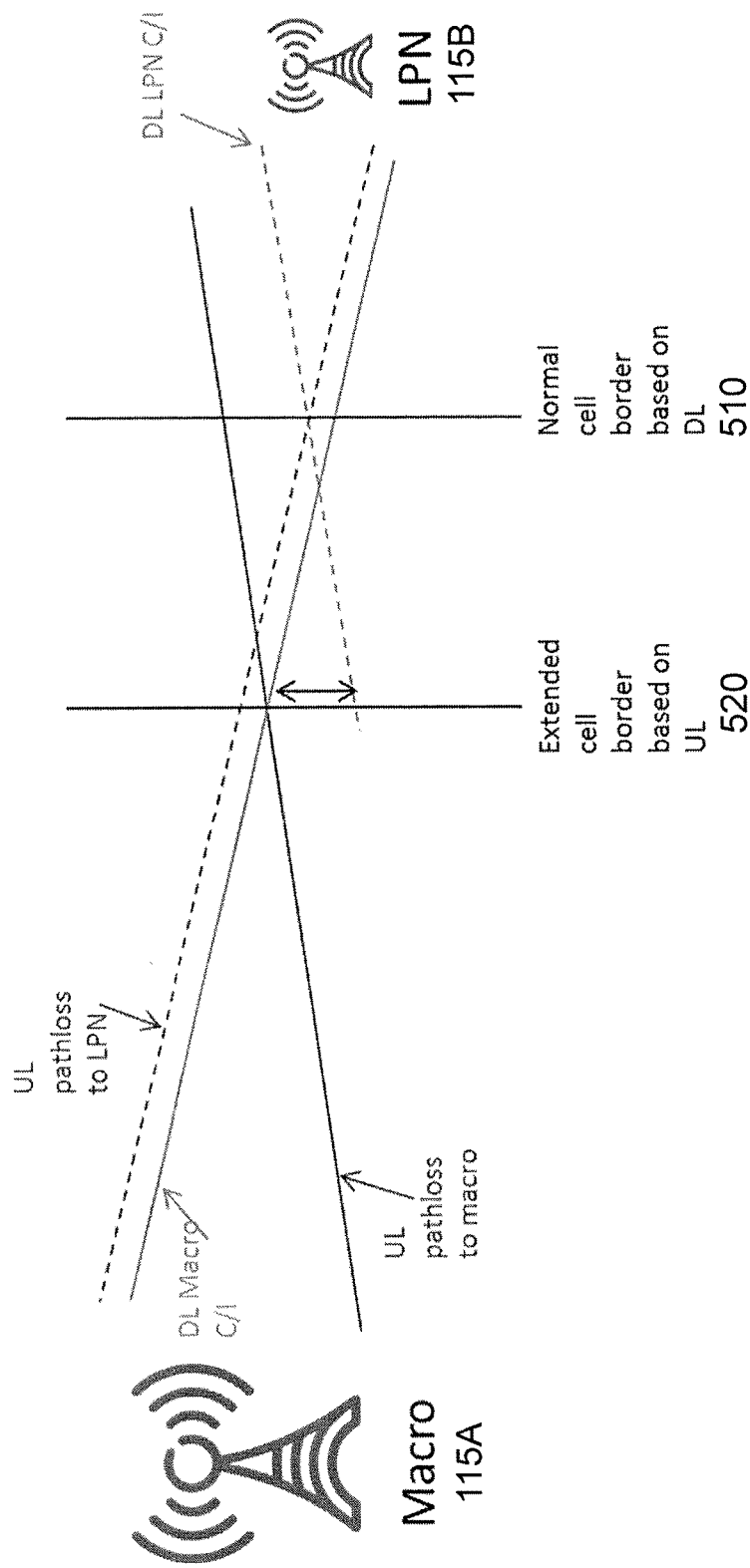
FIG. 5 illustrates low power node cell range extension due to unequal uplink path loss.
Figure 6:
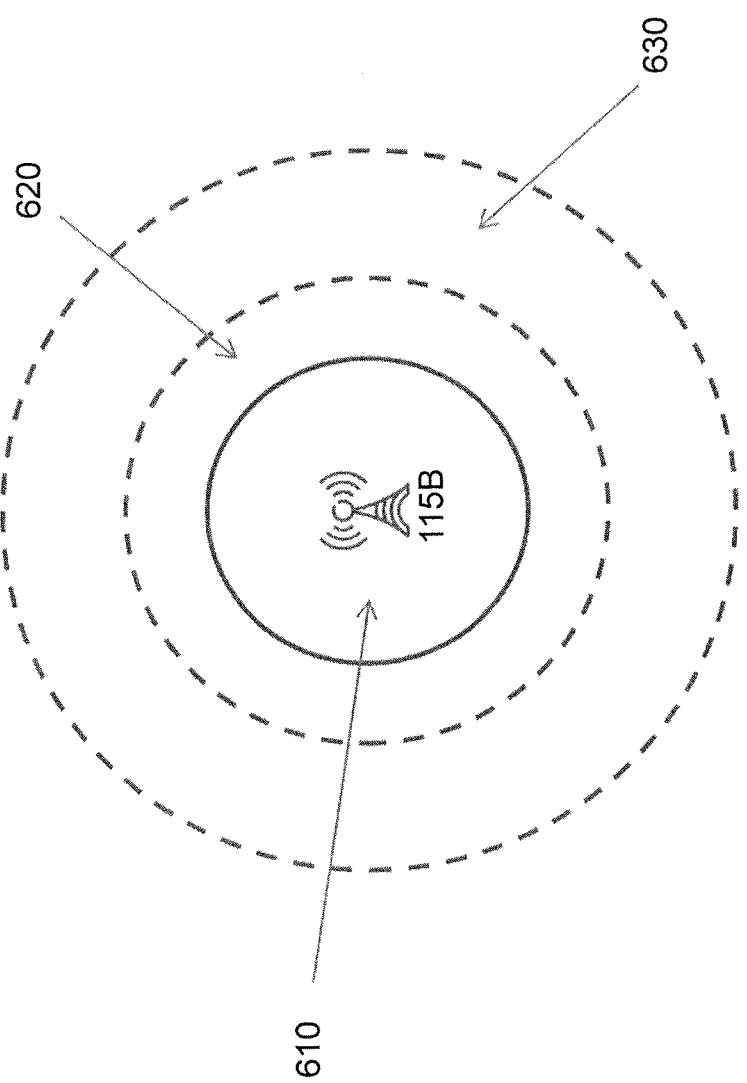
FIG. 6 illustrates an example of a low power node that is deployed within the coverage area of a macro node, in accordance with certain embodiments.

FIG. 6 illustrates an example of a low power node 115B that is deployed within the coverage area of a macro node. Three circles illustrating a plurality of coverage areas 610, 620, and 630 are shown. Coverage area 610 is the coverage area of LPN 115B; that is, the area within which the UE radio measurements such as CRS based RSRP and/or RSRQ measurements for LPN 115B exceed those from the macro node. In HSPA, the corresponding UE measurements are CPICH RSCP and CPICH Ec/No. In GSM, the corresponding UE measurement can be GSM carrier RSSI. These measurements are performed on cell specific reference or pilot signals as they are transmitted over the entire cell or in an omnidirectional manner. Coverage area 620 is the area within which LPN 115B RSRQ and RSRP estimates indicate that the quality from LPN 115B would be acceptable for user throughput without user specific beam forming. Coverage area 620 is the traditional cell range extension zone. Coverage area 630 is the area within which, with user specific beam forming, the downlink throughput from LPN 115B could be of sufficient quality that users within this area could be included into the cell range extension zone. The size of coverage area 630 will depend very much on the electronic beam forming configuration of LPN 115B. For example, LPN 115B may have an AAS architecture that is variable, for instance in the amount of nodes and the beam forming algorithm that is employed. Thus, it is not possible to standardize a single value. Instead, the value must be signaled from a particular implementation. In certain embodiments, a network node, such as LPN 115B, may calculate a beam forming quality indicator (i.e., signal offset value) taking into account the gain of the downlink beam forming, or additionally taking into account the gain of the uplink beam forming that it can perform.

Figure 7:
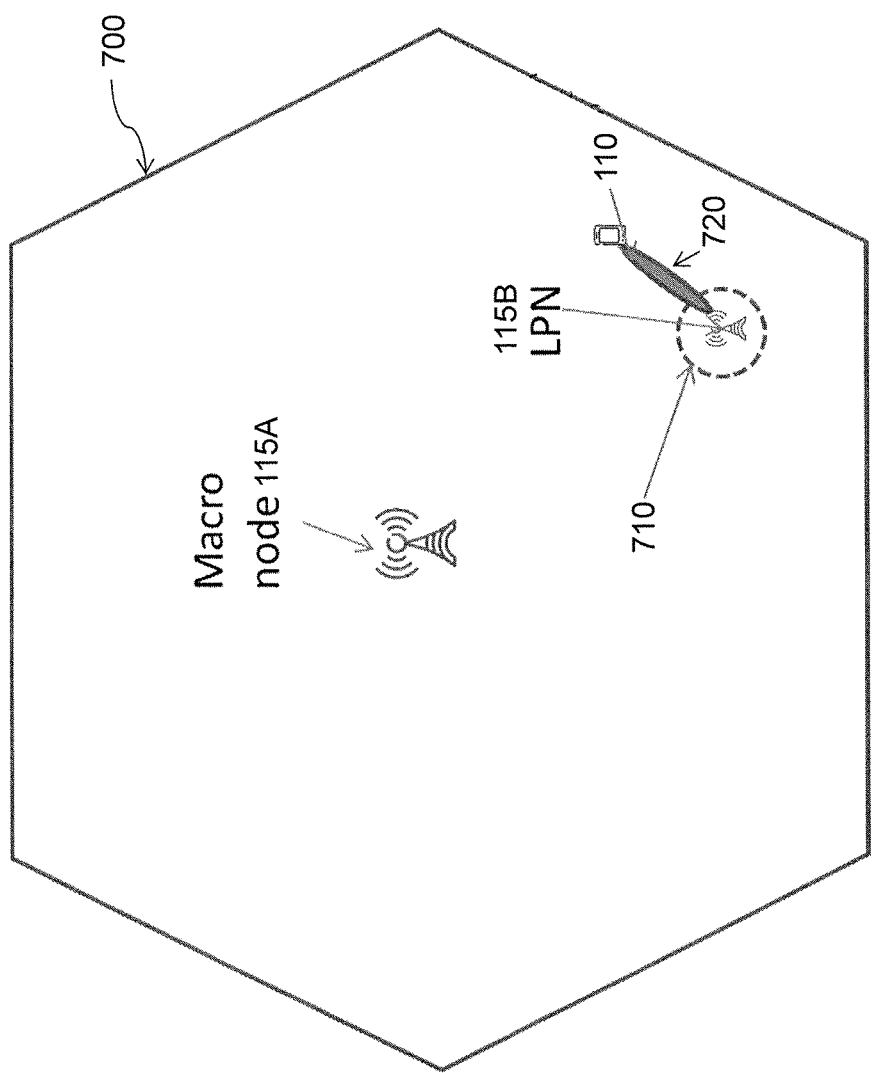
FIG. 7 illustrates user specific beam forming in a heterogeneous network scenario in which beam forming quality indicators may be utilized, in accordance with certain embodiments.

FIG. 7 illustrates user specific beam forming in a heterogeneous network scenario in which beam forming quality indicators may be utilized. A heterogeneous network may include high power nodes (HPN) serving macro cells and LPNs serving small cells, such as micro cells, or a combination of micro and pico cells, or even a combination of femto, micro and pico cells. For example, FIG. 7 illustrates a UE 110 located within coverage area 700 of macro node 115A. UE 110 is located outside coverage area 710 of LPN 115B. LPN 115B may, however, have electronic beam forming capability. For example, LPN 115B may be an AAS capable network node, and thus may be able to perform user specific beam forming to reach UE 110. Although certain embodiments may be described in the context of a heterogeneous network, the present disclosure contemplates that the various embodiments also apply to other network deployment scenarios, as would be apparent to one of ordinary skill in the art.

Within a heterogeneous network, LPNs, such as LPN 115B, may be deployed in order to offload the macro network in hotspot areas. Thus, it may be desirable to extend the range of the low power nodes. The received signal quality at UE 110 when user specific beam forming is applied using AAS processing capability may significantly enhance user performance. Higher received signal quality translates into better UE performance, e.g., higher UE throughput. However, as described above, user specific beam forming gain is specific to the configuration of the network node performing electronic beam forming. Thus, it may be beneficial for a network node to determine a beam forming quality indicator.

In certain embodiments, a network node, such as LPN 115B described above, may determine a beam forming quality indicator for the network node, and use it for one or more radio related tasks. The beam forming quality indicator may comprise at least or be a function of at least a reference signal quality ($Q_{Ref}$) and an actual achievable signal quality ($Q_{AAS}$) when LPN 115B applies its beam forming processing. The beam forming quality indicator may indicate a difference between the achievable signal quality and the reference signal quality. In certain embodiments, the beam forming quality indicator may be considered as an offset between the achievable signal quality measured by UE 110 on a pilot or reference signal not using beam forming, and the achievable signal quality that can be achieved by the AAS base station on signal with specific beam. The $Q_{Ref}$ estimation can also be made based on a fixed or pre-defined reference value, described in more detail below.

The beam forming quality indicator may be determined in any suitable manner. As described above, the beam forming quality indicator may be a function of at least a reference signal quality ($Q_{Ref}$) and an actual achievable signal quality ($Q_{AAS}$) when LPN 115B applies its beam forming processing. The beam forming quality indicator may be determined using any suitable function. Examples of functions which can be used for determining beam forming quality indicators ($Q_{AAS\_gain}$) include:

(1) $Q_{AAS\_gain} = f\{Q_{AAS}, Q_{Ref}\}$; a general function;

(2) $Q_{AAS\_gain} = f\{g, Q_{AAS}, Q_{Ref}\}$; a general function where g is a constant factor, which can be used to account for implementation error, impairments or any type of calibration;

(3) $Q_{AAS\_gain} = Q_{AAS}/Q_{Ref}$; where $Q_{AAS\_gain}$ is in linear scale assuming both $Q_{AAS}$ and $Q_{Ref}$ are linear quantity;

(4) $Q_{AAS\_gain} = (Q_{AAS} - Q_{Ref})$; where $Q_{AAS\_gain}$ is in dB scale assuming both $Q_{AAS}$ and $Q_{Ref}$ are in dB;

(5) $Q_{AAS\_gain}$=X percent, where $Q_{AAS\_gain}$ is expressed in terms of percentage of UE or cell throughput or bit rate gain of AAS with respect to the case when no AAS is applied.

In certain embodiments, the $Q_{Ref}$ may be based on UE measurement such as CRS based RSRP and/or RSRQ. Alternatively, the reference signal quality can also be a pre-defined value assuming no beam forming is applied on signal used for obtaining the reference value. For example, the pre-defined value can be the lowest level defined for a certain band, such as RSRP=−127 dBm for E-UTRA band 1 (2 GHz).

The $Q_{AAS}$ with AAS beam forming processing can be determined at UE 110 when LPN 115B uses AAS processing. In order to determine the AAS quality gain with respect to the reference signal quality, LPN 115B may obtain up to two measurement results (e.g. with and without AAS processing) at the same UE location and also around the same time. The measurement results may be obtained in any suitable manner. For example, the measurement results may be obtained in the background (e.g. offline during a survey) with a reference measurement device, or with an actual UE that can report back these results. In either case, the measurement results are stored in LPN 115B for further processing leading to determination of the beam forming quality indicator, as described below.

In certain embodiments, LPN 115B may also obtain the measurement results from a plurality of UEs or measuring device and/or a plurality of measurement results from the same UE or measuring device. For example, LPN 115B may determine the gain of using AAS by comparing the bit rate received at UE 110 when AAS based beam forming is applied with the bit rate received at UE 110 when no AAS based beam forming is applied.

In order to determine uplink beam forming quality indicator, LPN 115B may obtain the UL reference signal quality and also the UL achievable received signal quality with AAS beam forming processing by performing measurement on signals received from UE 110. The network node may also use UE 110 UL measurements done on its transmitted signals (e.g., transmit power with and without beam forming) to determine the UL reference signal quality and the UL achievable received signal quality with AAS beam forming processing. The beam forming quality indicator can be estimated for downlink as well as for uplink.

In certain embodiments, to determine the beam forming quality indicator, LPN 115B may obtain a difference between the $Q_{AAS}$ and the $Q_{Ref}$, without obtaining the signal quality measurement itself. For example, the beam forming quality indicator may be a difference between RSRQ measured at a UE (i.e., $Q_{Ref}$) and RSRQ if beam forming were applied (i.e., $Q_{AAS}$). LPN 115B could make the estimate of $Q_{AAS}$ by taking into account its antenna array gain, and signal it to UEs. In such a scenario, LPN 115B may not need to obtain an actual RSRQ; it estimates $Q_{AAS}$ based on knowledge of its hardware capability, and it is the UE that knows the $Q_{Ref}$. In certain embodiments, LPN 115B may not directly use the signal quality parameters $Q_{AAS}$ and $Q_{Ref}$ to determine the beam forming quality indicator. LPN 115B may use any other suitable parameters to determine the beam forming quality indicator, such as, for example, one or more of one or more multi-antenna configuration parameters, one or more characteristics of a beam, one or more characteristics of a radiation pattern, and a frequency band or range of frequencies. The other suitable parameters may indirectly imply the relationship between the $Q_{AAS}$ and the $Q_{Ref}$.

LPN 115B may also obtain an overall $Q_{Ref}$ and an overall $Q_{AAS}$ for each cell. The network node may use any suitable mathematical function to obtain overall $Q_{Ref}$ and overall $Q_{AAS}$ for each cell. The method can be separately applied for uplink and downlink. Examples of functions for determining the overall signal quality are average, median, xth percentile, and any other suitable function. Thus, the beam forming quality indicator may be a function of overall $Q_{Ref}$ and $Q_{AAS}$, or it may be a function of just one set of obtained $Q_{Ref}$ and $Q_{AAS}$.

There may be multiple values of beam forming quality indicator for each cell. In certain embodiments, the multiple values of beam forming quality indicator may depend upon, for example, user location and/or elevation in the cell. Thus, there may be two levels of beam forming quality indicators. For example, a first beam forming quality indicator level may be for UEs in cell border or CRE zone, and the second beam forming quality indicator level may be for UEs in the remaining area of the cell (e.g., inner or central parts). As another example, a first beam forming quality indicator level may be for UEs located in high rise buildings above a certain height (e.g., 30 m or more), and a second beam forming quality indicator level may be for UEs on the ground or at a height below a threshold (e.g. below 30 m). Thus, there may be a different beam forming quality indicator depending on the location of UE 110 in the cell. For example, LPN 115B may determine a first beam forming quality indicator based on UE 110's position in the cell. However, LPN 115B may determine a second beam forming quality indicator, at a different level than the first, if UE 110 moves to an area of higher elevation within the cell.

The beam forming quality indicator may be influenced by a variety of criteria beyond the $Q_{Ref}$, $Q_{AAS}$, and the location of UE 110 within a cell. For example, the beam forming quality indicator may depend in part upon the AAS configuration supported by the network node. Examples of AAS configuration parameters may include number of transceivers, number of antennas, size of array of antenna elements, physical separation or distance between antenna elements, physical location of antenna elements within antenna grid, beam characteristics (e.g., radiation pattern, beam-width), geometry of the antenna array, gain and phase accuracy of the transceiver chains, degree of mutual coupling in the antenna array, impedance matching between transceivers and antennas, frequency accuracy of the transceivers, scanning angles in the elevation and azimuth domain, distortions in the element radiation patterns due to integration of the whole base station or radio network node, phase tapering capability (i.e., the ability to move nulls in the radiation pattern), amplitude tapering capability (i.e., the ability to suppress side lobes), size of radio distribution unit in terms of controlling or managing the number of RF transceivers and antennas, or any other suitable configuration parameter. Both amplitude and phase tapering techniques may be used for enhancing beam forming performance, i.e., to achieve wanted antenna performance and/or characteristics. Furthermore, the beam forming quality indicator may also depend upon the type of beam forming. For example, different beam forming quality indicator values may be determined for non-coherent beam forming, coherent beam forming, or other types of beam forming. Thus, a beam forming quality indicator determined by LPN 115B may vary depending on the configuration of its AAS architecture, and the type of beam forming it performs.

The beam forming quality indicator may also have multiple values corresponding to the level of AAS configuration that can be used for performing beam forming, e.g., a minimum, a maximum value and mean value. For example, the different values may depend upon the extent to which the AAS configuration resources (e.g., RF transceivers, array of antenna elements, etc.,) can be used for a particular type of beam forming. This is due to the fact that the AAS network node may not always use all of its AAS configuration resources for serving one UE. Thus, the beam forming quality indicator for LPN 115B may vary depending on how much of its AAS resources it uses for serving UE 110.

The beam forming quality indicator may also be specific to a particular frequency band, a group of frequency bands or range of frequencies. For example, the same value of the beam forming quality indicator may apply for the frequency bands which are below 1 GHz, and the same value of the beam forming quality indicator may apply for the frequency bands which are above 2 GHz.

The beam forming quality indicator need not be viewed as a static value. In certain embodiments, the beam forming quality indicator may be updated regularly, or whenever there is a change in the network node radio configuration. For example, if parameters of LPN 115B, such as antenna configuration, cell bandwidth, or any other suitable parameter is changed, then LPN 115B may re-evaluate the beam forming quality indicator and store the modified value in its memory for future use.

As described above, the network node, such as LPN 115B, may use the determined beam forming quality indicator for one or more radio operation related tasks. For example, in certain embodiments LPN 115B may store the beam forming quality indicator in a memory or database for use at a future time. As another example, LPN 115B may use the beam forming quality indicator for scheduling its own UE. As yet another example, LPN 115B may signal the beam forming quality indicator to other nodes, such as UE 110 and/or other network nodes, such as macro node 115A. These various embodiments are described in more detail below.

In certain embodiments, the network node that determined its beam forming quality indicator, such as LPN 115B, may communicate the determined beam forming quality indicator to one or more neighboring network nodes. For example, in FIG. 7 LPN 115B may determine its beam forming quality indicator as described above, and signal the determined beam forming quality indicator to macro node 115A. The beam forming quality indicator may relate to the difference between radio measurements, such as RSRP, made at the edge of a coverage area in the traditional cell range extension zone and a coverage area which, using user specific beam forming, could be included in the cell range extension zone, such as coverage areas 710 and 720 described above.

LPN 115B may signal one or a plurality of beam forming quality indicators, examples of which have been described above. For example, LPN 115B may signal one beam forming quality indicator for UEs above a certain height within the cell. In certain embodiments, LPN 115B may signal beam forming quality indicators corresponding to one or more beam forming configurations. More specifically, the different signaled beam forming quality indicators may be applicable for beam forming in UL, beam forming in DL, elevation beam forming for UEs above certain height in UL or DL, ground level beam forming for UE on ground or up to certain height in UL or DL, or any other suitable beam forming configuration. The type of metric or function used for deriving the beam forming quality indicator or representing the signaled beam forming quality indicator can be pre-defined, e.g. linear, log, or percentage throughput gain, as described above.

The beam forming quality indicator may be communicated in any suitable manner, and the manner in which the beam forming quality indicator is communicated may vary according to the type of network in which the beam forming quality indicator is determined. As one example, in LTE the beam forming quality indicator may be signaled by one eNodeB (e.g., first network node) to other eNodeBs (e.g., second network nodes) via an X2 interface. As another example, in HSPA the beam forming quality indicator may be signaled by one Node B (e.g., first network node) to RNCs (e.g., second network nodes) via an Iub interface. In this case, the second network node may further signal the received indicator to other NodeBs (e.g., third network node), which are neighboring to first network node. The RNC may also signal the received indicator to other RNCs, which may signal it to NodeBs under its control.

In certain embodiments, the first network node, such as LPN 115B, may signal the beam forming quality indicator to other types of nodes, such as SON, OSS, O&M, or any other suitable node. The beam forming quality indicator may be signaled proactively, or based on a request received from the second network node. Proactive reporting may be done at any suitable time. For example, LPN 115B may proactively report the beam forming quality indicator. Proactive reporting may be done periodically, whenever the indicator is modified, if there is change in any radio configuration in LPN 115B, or when a new second network node is detected.

In certain embodiments, the target or neighboring second or third network nodes, such as network node 115A, may obtain or determine the beam forming quality indicator of the first network node, such as LPN 115B, without receiving an explicit indication from the first network node. The determination may be made in any suitable manner. As one example, macro node 115A may determine the beam forming quality indicator of LPN 115B autonomously, or based on a stored value or historical information. For example, macro node 115A may be manually or via O&M or OSS configured with the beam forming quality indicator of LPN 115B. In yet another example, macro node 115A may be configured with at least the information about the AAS configuration (e.g., RF transceivers, array of antenna elements, RDN, or any other suitable information) used in LPN 115B. Macro node 115A may use this information to autonomously determine the expected beam forming quality indicators applicable for use in LPN 115B.

In operation, macro node 115A may receive a measurement report from UE 110 located in a coverage area such as coverage area 630 described above, in which, with user specific beam forming, the downlink throughput from LPN 115B could be of sufficient quality that users within this area could be included into the cell range extension zone. Macro node 115A may be overloaded. Generally, macro node 115A would not attempt to change the cell of UE 110 to LPN 115B since UE 110 would appear to be outside of the cell range extension zone. However, macro node 115A may consider at least the beam forming quality indicator (i.e., received or obtained offset value) indicated by LPN 115B when performing cell change of UE 110 to LPN 115B. Macro node 115A may also use additional measurements, such as UE measurement reports, for performing the cell change of UE 110. Examples of cell change may include handover, RRC connection re-establishment, RRC connection release with redirection, PCell change in carrier aggregation (CA) or multicarrier (MC), primary component carrier (PCC) change in CA or MC etc. The decision to make a cell change of UE 110 to LPN 115B is made using at least the beam forming quality indicator, potentially improving both UE 110A's throughput and the throughput of other traffic served from the macro cell.

Macro node 115A's use of the beam forming quality indicator obtained from LPN 115B for performing cell change can be described in more detail as follows. Macro node 115A may use the obtained or received beam forming quality indicator of LPN 115B such that UE 110 may be handed over to LPN 115B, even though LPN 115B may not be the strongest cell in terms of UE measurement. Assume, for example, that macro node 115A is a network node serving UE 110. Macro node 115A obtains beam forming quality indicators of two of its closest network nodes (LPN 115B and another network node). The serving macro node 115A also receives radio measurement results of the measurements (e.g., RSRQ) performed by UE 110 on LPN 115B and the other network node. Further assume that RSRQ of the other network node is higher than that of LPN 115B, and that beam forming quality indicators depicts that LPN 115B can provide better beam forming gain. Therefore, serving macro node 115A decides to perform cell change of UE 110A to LPN 115B instead of to the other network node.

In performing cell change based at least in part on a beam forming quality indicator, macro node 115A may consider other criteria. As one example, macro node 115A may take into account the desired or target user bit rate. For example, if UE 110 does not need higher bit rate, which may be provided using user specific beam forming from LPN 115B, then the serving network decides to perform cell change of UE 110 to the other network node. If UE 110 does need higher bit rate (i.e., UE bit rate above certain threshold or at least x=70 percentage of maximum user bit rate), then macro node 115A may decide to perform cell change of UE 110 to LPN 115B. As another example, serving macro node 115A may also take into account overall interference in the cell or a plurality of cells. For example, in order to reduce overall interference in the cell, or in part of the network, the serving network may decide to perform cell change of UE 110 to LPN 115B even if UE 110 does not need higher bit rate.

LPN 115B may also communicate its beam forming quality indicator to UE 110. In certain embodiments, LPN 115B may signal information on the beam forming quality indicator (e.g., signal quality offset between an area in which, with user specific beam forming, the downlink throughput from LPN 115B could be of sufficient quality that users within this area could be included into the cell range extension zone, and the traditional range extension) to UE 110. LPN 115B may signal UE 110 at least its own beam forming quality indicator, and may also signal beam forming quality indicators of one or more of its neighboring cells. The beam forming quality indicator may be communicated in any suitable manner. This might, for example, be achieved by including such information in cell broadcast information for the UEs in low activity states, such as RRC idle, idle state, CELL_FACH, CELL_PCH or URA_PCH states. The information may also be signaled to UE 110 on UE specific channels (e.g., DCH, PDSCH, HS-DSCH, or any other suitable channel) for UEs in RRC connected state or CELL_DCH state. If UE 110 is device to device (D2D) capable, UE 110 may also obtain the information about the beam forming quality indicator of one or more network nodes from another D2D capable UE that has such information.

In certain embodiments, UE 110 may perform one or more radio operations based at least in part on the obtained beam forming quality indicator. For example, UE 110A may be configured by a network node (e.g., by macro network node 115A) to correct its measurement reports (e.g., RSRP and RSRQ) according to any information it receives about the gain of user specific beam forming (i.e., beam forming quality indicator) in a cell. UE 110 may apply the correction to the measurement results in any suitable manner. In certain embodiments, UE 110 may apply the correction to the measurement based on a pre-defined rule. For example, the configuration or pre-defined rule may be that UE 110 shall augment a certain measured quantity result (e.g., RSRP) by the amount of the beam forming quality indicator in log scale, and report the augmented certain measurement quantity (e.g., RSRP) to the network or use it for certain radio operation tasks. UE 110 may also be configured to or based on a pre-defined rule report the measurement result of a certain measurement quantity with and without applying the correction corresponding to the beam forming quality indicator. As another example, it may be pre-defined that UE 110 shall signal the augmented measurement results for a certain cell provided the beam forming quality indicator is at least above a threshold. The threshold may be any suitable value, and in certain embodiments may be 2 dB. Thus, UE 110 in an area in which, with user specific beam forming, the downlink throughput from LPN 115B could be of sufficient quality that users within this area could be included into the cell range extension zone, may report a higher signal quality than it would have done without the beam forming quality indicator. In operation, when UE 110 is served by macro cell 115A, macro cell 115A can easily offload UE 110 to LPN 115B based on the augmented measurement report.

In addition to modifying measurement reports, UE 110 may use the signaled beam forming quality indicator to enhance cell change procedure. As described above, LPN 115B may signal to UE 110 at least its own beam forming quality indicator. LPN 115B may also signal beam forming quality indicators of one or more of its neighboring cells to UE 110. UE 110 may use the received one or more beam forming quality indicators for one or more procedures related to cell change. As described above, examples of cell change procedures include cell selection, cell reselection, RRC connection re-establishment after RRC connection failure or loss of RRC connection, etc. The way UE 110 applies the received information relating to the beam forming quality indicators during cell change procedure may be pre-defined, or may be configured by the network node. For example, if UE 110 is in low activity RRC state (i.e., in idle mode, or a WCDMA state, such as CELL_FACH or CELL_PCH), UE 110 may use the received information for performing cell reselection. UE 110 may apply the received information relating to the beam forming quality indicators in any suitable manner.

In one example, when evaluating pilot or reference signal based radio measurements (e.g., RSRP) on LPN 115B in order to make reselection decisions, UE 110 may add the signal quality offset equal to the beam forming quality indicator that LPN 115B has previously signaled to UE 110. When in an area in which, with user specific beam forming, the downlink throughput from LPN 115B could be of sufficient quality that users within this area could be included into the cell range extension zone, the reselection decision may be made based on the pilot measurement adjusted with the offset, and UE 110 may reselect to LPN 115B. Then, when UE 110 goes into a connected state, UE 110 is served by LPN 115B without any need for handover from macro node 115A.

In another example, UE 110 may not apply the signal quality offset equal to the beam forming quality indicator to the radio measurement performed on the target cell (e.g., reference signals of LPN 115B). Prior to reselecting a cell, however, UE 110 may read its system information and determine the value of the signaled beam forming quality indicator. UE 110 may select a cell whose beam forming quality indicator value is larger than certain threshold, e.g., 2 dB or more. The threshold may be pre-defined or configured by a network node, such as the serving network node of UE 110.

In certain embodiments, UE 110 may communicate capability information associated with using beam forming quality indicators. For example, UE 110 may signal capability information to a network node (e.g., a serving network node such as a base station, eNode B, RNC, BSC, core network (MME), or any other suitable node). The capability information may indicate whether UE 110 is capable of using information related to the received beam forming quality indicator for one or more radio operations. As described above, capable UEs may perform one or more radio operations based at least in part on a beam forming quality indicator. For example, the one or more radio operations may include enhancing radio measurements and applying the beam forming quality indicator to cell change procedures.

In addition to information relating to UE 110's ability to use a beam forming quality indicator for one or more radio operations, the UE capability information may also contain additional or more specific information. For example, the capability information may indicate that the received beam forming quality indicator can be used for certain types of cell change procedures, such intra-frequency cell reselection and/or inter-frequency. The capability information may also include information relating to when a UE can use a beam forming quality indicator. For example, the capability information communicated by UE 110 may indicate that UE 110 is capable of using the beam forming quality indicator only when using certain types of measurement, e.g., RSRQ.

In certain embodiments, UE 110 may communicate the capability information to a node, such as macro node 115A and/or LPN 115B in any suitable manner. As one example, UE 110 may proactively report the capability information without receiving an explicit request from the node (e.g., serving or any target network node). In the case of proactive reporting, UE 110 may report its capability at any suitable point. For example, UE 110 may proactively report during initial setup or call setup with the network node, e.g., when establishing the RRC connection. As another example, UE 110 may proactively report during cell change, e.g., handover, primary carrier change in multi-carrier operation, PCell change in multi-carrier operation, RRC re-establishment, and RRC connection release with redirection. In certain embodiments, UE 110 may proactively report capability information at one or more of the above described points, or at any other suitable point.

As another example, UE 110 may report the capability information upon receiving an explicit request from the network node (e.g., serving or any target network node). The explicit request may be sent to UE 110 at any time or at any specific occasion. For example, the request for the capability reporting may be sent to UE 110 during initial setup, or after a cell change (e.g., handover, RRC connection re-establishment, RRC connection release with redirection, PCell change in carrier aggregation (CA) or multicarrier (MC), primary component carrier (PCC) change in CA or MC, or other suitable cell change procedure).

The acquired UE 110 capability information may be used by a network node (e.g., eNode B, base station, etc.), such as network node 115A or LPN 115B, for performing one or more radio operation tasks or network management tasks. For example, LPN 115B may forward the received capability information for UE 110 to another network node, such as macro node 115A, which may use it after cell change of UE 110. As another example, LPN 115B may decide based on the received capability information whether to signal the beam forming quality indicator to UE 110 or not.

Figure 8:
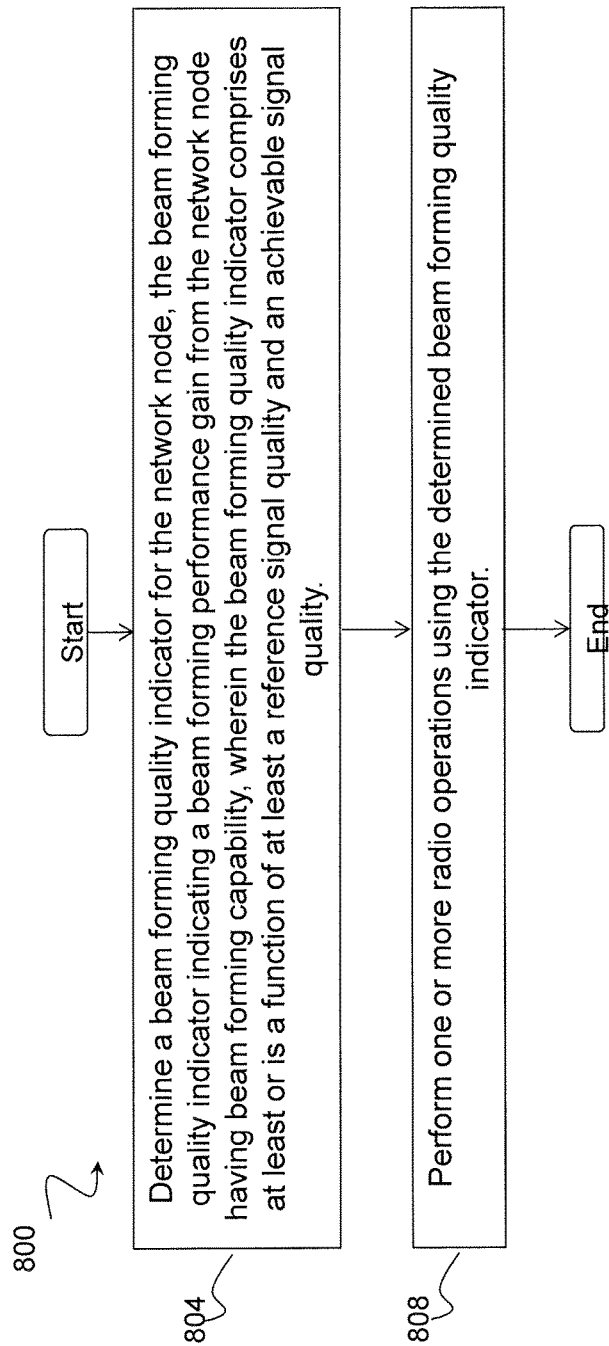
FIG. 8 illustrates a method in a network node, in accordance with an embodiment.

FIG. 8 illustrates a method in a network node, in accordance with an embodiment. The method begins at step 804, when the network node determines a beam forming quality indicator for the network node. The beam forming quality indicator indicates a beam forming performance gain from the network node having beam forming capability. The beam forming quality indicator comprises at least or is a function of at least a reference signal quality and an achievable signal quality. The reference signal quality may be a signal quality measurement on a pilot or reference signal not using beam forming. The achievable signal quality may be a signal quality that can be achieved on a signal with a user specific beam by the network node using beam forming. In certain embodiments, the function defining the beam forming quality indicator may further comprise one or more of one or more multi-antenna configuration parameters, one or more characteristics of a beam, one or more characteristics of a radiation pattern, and a frequency band or range of frequencies. The beam forming quality indicator may be any suitable function of the reference signal quality and the achievable signal quality. In certain embodiments, the function of the reference signal quality and the achievable signal quality may be a difference between the actual achievable signal quality and the reference signal quality.

At step 816, the network node performs one or more radio operations using the determined beam forming quality indicator. The network node may perform any suitable task using the determined beam forming quality indicator. For example, in certain embodiments the network node may communicate the determined beam forming quality indicator to a second network node. The network node may receive a request that the network node communicate the beam forming quality indicator to another network node. As another example, the network node may communicate the determined beam forming quality indicator to a user equipment. As yet another example, the network node may store the beam forming quality indicator.

In certain embodiments, the network node may update the determined beam forming quality indicator. As one example, the network node may update the determined beam forming quality indicator on a periodic basis. As another example, the network node may determine that one or more network node radio configuration parameters have changed, and may update the determined beam forming quality indicator upon determining that one or more network node radio configuration parameters have changed.

In certain embodiments, the network node may communicate a request for capability information to a user equipment. The network node may receive capability information from the user equipment. The capability information may include information about an ability of the user equipment to use the beam forming quality indicator for one or more radio operations. The network node may communicate the received capability information to one or more network nodes, and may determine whether to communicate the determined beam forming quality indicator to the user equipment based at least in part on the received capability information.

Figure 9:
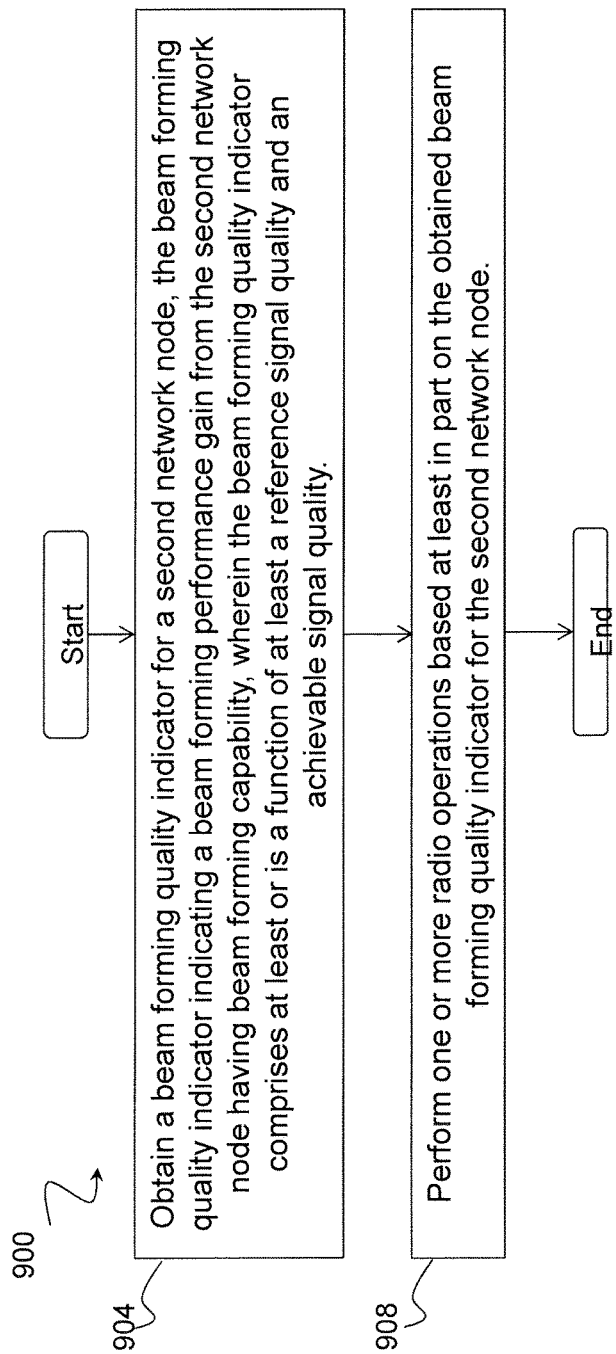
FIG. 9 illustrates a method in a network node, in accordance with an embodiment.

FIG. 9 illustrates a method in a network node, in accordance with an embodiment. The method begins at step 904, when the network node obtains a beam forming quality indicator for a second network node. The beam forming quality indicator indicates a beam forming performance gain from the second network node having beam forming capability. The beam forming quality indicator comprises at least or is a function of at least a reference signal quality and an achievable signal quality. In certain embodiments, the function defining the beam forming quality indicator may further comprise one or more of one or more multi-antenna configuration parameters, one or more characteristics of a beam, one or more characteristics of a radiation pattern, and a frequency band or range of frequencies.

The network node may obtain the beam forming quality indicator in any suitable manner. For example, the network node may receive the beam forming quality indicator for the second network node from the second network node. As another example, the network node may autonomously determine the beam forming quality indicator for the second network node. In certain embodiments, the network node may communicate a request for the second network node's beam forming quality indicator to the second network node.

At step 908, the network node performs one or more radio operations based at least in part on the obtained beam forming quality indicator for the second network node. In certain embodiments, the network node may be serving a user equipment, and in performing one or more radio operations based at least in part on the obtained beam forming quality indicator for the second network node, the network node may determine, based at least in part on the obtained beam forming quality indicator, that the second network node can provide better beam forming gain than a third network node. The third network node may have a higher reference signal received quality than the second network node. The network node may perform cell change of the user equipment to the second network node.

In certain embodiments, the beam forming quality indicator may be a first beam forming quality indicator. The first beam forming quality indicator may correspond to a first beam forming configuration. The network node may obtain a second beam forming quality indicator. The second beam forming quality indicator may correspond to a second beam forming configuration. The first beam forming configuration and the second beam forming configuration may be selected from a group including beam forming in uplink, beam forming in downlink, elevation beam forming in uplink or downlink, and ground level beam forming in the uplink or downlink.

Figure 10:
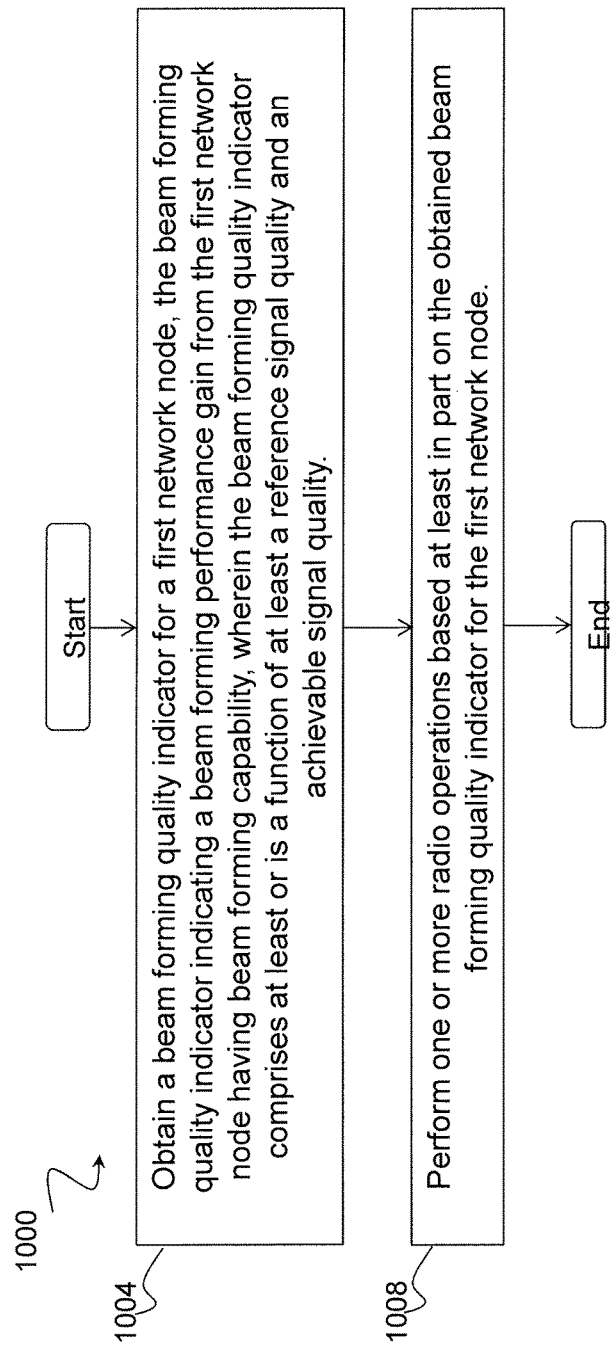
FIG. 10 illustrates a method in a user equipment, in accordance with an embodiment.

FIG. 10 illustrates a method in a user equipment, in accordance with certain embodiments. The method begins at step 1004, when the user equipment obtains a beam forming quality indicator for a first network node. The beam forming quality indicator indicates a beam forming performance gain from the first network node having beam forming capability. The beam forming quality indicator comprises at least or is a function of at least a reference signal quality and an achievable signal quality. In certain embodiments, the function defining the beam forming quality indicator may further comprise one or more of one or more multi-antenna configuration parameters, one or more characteristics of a beam, one or more characteristics of a radiation pattern, and a frequency band or range of frequencies.

At step 1008, the user equipment performs one or more radio operations based at least in part on the obtained beam forming quality indicator for the first network node. The user equipment may perform any suitable radio operation. For example, the user equipment may modify one or more measurement reports based at least in part on the obtained beam forming quality indicator. The one or more measurement reports may include one or more of reference signal received power and reference signal received quality. The user equipment may report the modified measurement report to one or more network nodes. In certain embodiments, the user equipment may determine whether the beam forming performance gain indicated by the beam forming quality indicator exceeds a threshold, and report the modified measurement report to one or more network nodes upon a determination that the beam forming performance gain indicated by the beam forming quality indicator exceeds the threshold.

As another example, the user equipment may use the obtained beam forming quality indicator for one or more cell change procedures. The cell change procedures may include cell selection, cell reselection, and RRC connection re-establishment. For example, the one or more cell change procedures may be cell reselection, and the user equipment may determine one or more reference signal measurements for the first network node, and modify the one or more reference signal measurements based at least in part on the beam forming quality indicator for the first network node. The user equipment may reselect, upon entering an area of a cell in which beam forming by the first network node would provide downlink throughput levels corresponding to a cell range extension zone, the first network node without a handover from a second network node. As another example, the user equipment may determine the beam forming performance gain indicated by the beam forming quality indicator for the first network node, and select a cell having a beam forming performance gain above a threshold.

In certain embodiments, the first network node may be serving the user equipment, and the user equipment may obtain a beam forming quality indicator for at least a second network node, the beam forming quality indicator for the second network node larger than the beam forming quality indicator for the first network node by at least a beam forming quality indicator. The user equipment may determine, based at least in part on the obtained beam forming quality indicators for the first and second network nodes, that the second network node can provide better beam forming performance gain than the first network node, and perform cell change of the user equipment from the first network node to the second network node.

In some embodiments, the user equipment may communicate capability information to one or more network nodes. The capability information may indicate the user equipment's ability to use the beam forming quality indicator to perform one or more radio operations. In certain embodiments, the user equipment may receive a request to communicate capability information to one or more network nodes.

Throughout the present disclosure, numerous specific details have been set forth. However, it is understood that embodiments of the present disclosure may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References throughout the present disclosure to "one embodiment," "an embodiment," "an example embodiment," "certain embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In some embodiments, the general term "network node" is used, and it can correspond to any type of radio network node or any network node, which communicates with a UE and/or with another network node. Examples of network nodes are Node B, base station (BS), multi-standard radio (MSR) radio node such as MSR BS, eNode B, low power node, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Although certain embodiments may be described in the context of specific examples involving particular types of nodes, such as macro nodes and low power nodes, the present disclosure is not limited to applications involving those nodes. The present disclosure contemplates that the various embodiments may be applied any suitable scenario using any suitable types of network nodes.

In some embodiments, the non-limiting term user equipment (UE) is used, and it refers to any type of wireless device communicating with a network node and/or with another UE in a cellular or mobile communication system. Examples of UE may include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable device. The network nodes and user equipment are described in more detail below with respect to FIGS. 11, 12, and 13.

It should also be noted that although terminology from 3GPP LTE has been used in this disclosure to exemplify the embodiments described herein, this should not be seen as limiting the scope of the invention to only the aforementioned system. Other wireless systems, including WCDMA, HSPPA, WiMax, WiFi, WLAN, GSM/GERAN, and any other suitable wireless system may also benefit from exploiting the scope of this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

It should be further noted that these embodiments are not mutually exclusive. Components from one embodiment may be tacitly assumed to be present in another embodiment and it will be obvious to a person skilled in the art how those components may be used in the other exemplary embodiments.

The embodiments described herein can be implemented in a network node and a UE. Although some embodiments are described for specific deployment scenarios, such as 3GPP LTE heterogeneous network deployment, the present disclosure contemplates that the various embodiments can be applied and implemented in nodes (UE and network node) of any type of radio access technology and also in any type of network deployment scenario. For example the embodiments can also be applied in homogeneous network deployment where all network nodes are of the same base station power class e.g. all are high power node (HPN) or all are low power node (LPN). In a heterogeneous network deployment the network nodes consist of mixture of HPN and LPN. Furthermore the embodiments are also applicable to heterogeneous or homogenous network deployment based on other technologies such as WCMDA/HSPA, GSM/GERAN/EDGE, CDMA2000/HRPD, WLAN or similar wireless communication technologies.

Although the embodiments are mainly described for single carrier operation of the UE or use of single carrier in a network node, the embodiments are applicable for multi-carrier or carrier aggregation operation. Thus, the method of signaling information to the UE or to the other network nodes can be carried out independently for each cell on each carrier frequency supported by the network node.

Figure 11:
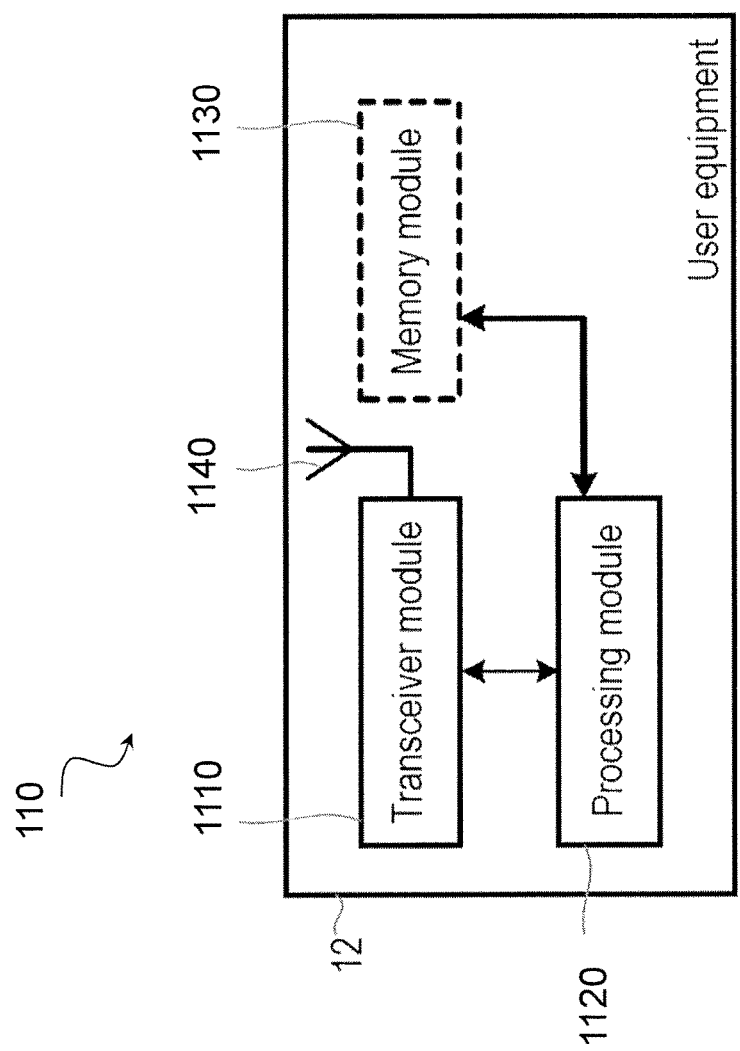
FIG. 11 a block schematic of an exemplary wireless device suitably operative in accordance with certain embodiments.

FIG. 11 a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication.

A wireless device 110 may also be referred to as user equipment (UE), a station (STA), a device, or a terminal in some embodiments. Wireless device 110 includes transceiver 1110, processor 1120, and memory 1130. Transceiver 1110 may also be referred to as transceiver module 1110. In some embodiments, transceiver 1110 facilitates transmitting wireless signals to and receiving wireless signals from network node 115 (e.g., via an antenna 1140). Processor 1120 may also be referred to as processing module 1120, and controls the operation of wireless device 110. Processor 1120 executes instructions to provide some or all of the functionality described above as being provided by UE 110. The processing module 1120 is connected to the receiver or transceiver module 1110 with associated antenna(s) 1140 which are used to receive signals from or both transmit signals to and receive signals from a base station 115 in the network 100. To make use of discontinuous reception (DRX), the processing module 1120 can be configured to deactivate the receiver or transceiver module 1110 for specified lengths of time. Memory 1130 may also be referred to as memory module 1130. Memory module 1130 is connected to the processing module 1120, and stores program and other information and data required for the operation of wireless device 110. For example, memory 1130 stores the instructions executed by processor 1120. In some embodiments, wireless device 110 may optionally comprise a satellite positioning system (e.g. GPS) receiver module that can be used to determine the position and speed of movement of wireless device 110.

Processor 1120 may include any suitable combination of hardware and software implemented in one or more modules to execute instructions and manipulate data to perform some or all of the described functions of wireless device 110. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

Other embodiments of wireless device 110 may include additional components beyond those shown in FIG. 11 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may perform one or more radio operations based at least in part on the obtained beam forming quality indicator for the first network node. As one example, the determining module may modify one or more measurement reports based at least in part on the obtained beam forming quality indicator. As another example, the determining module use the obtained beam forming quality indicator for one or more cell change procedures. The determining module may include or be included in processor 1120. The determining module may include analog and/or digital circuitry configured to perform any of the functions of the determining module and/or processor 1120. The functions of the determining module described above may, in certain embodiments, be performed in one or more distinct modules.

The communication module may perform the transmission functions of wireless device 110. The communication module may transmit messages to one or more of network nodes 115 of network 100. For example, the communication module may report a modified measurement report to one or more network nodes. As another example, the communication module may communicate capability information to one or more network nodes. The communication module may include a transmitter and/or a transceiver, such as transceiver 1110. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may obtain a beam forming quality indicator for a first network node. As another example, the receiving module may receive a request to communicate capability information to one or more network nodes. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 12:
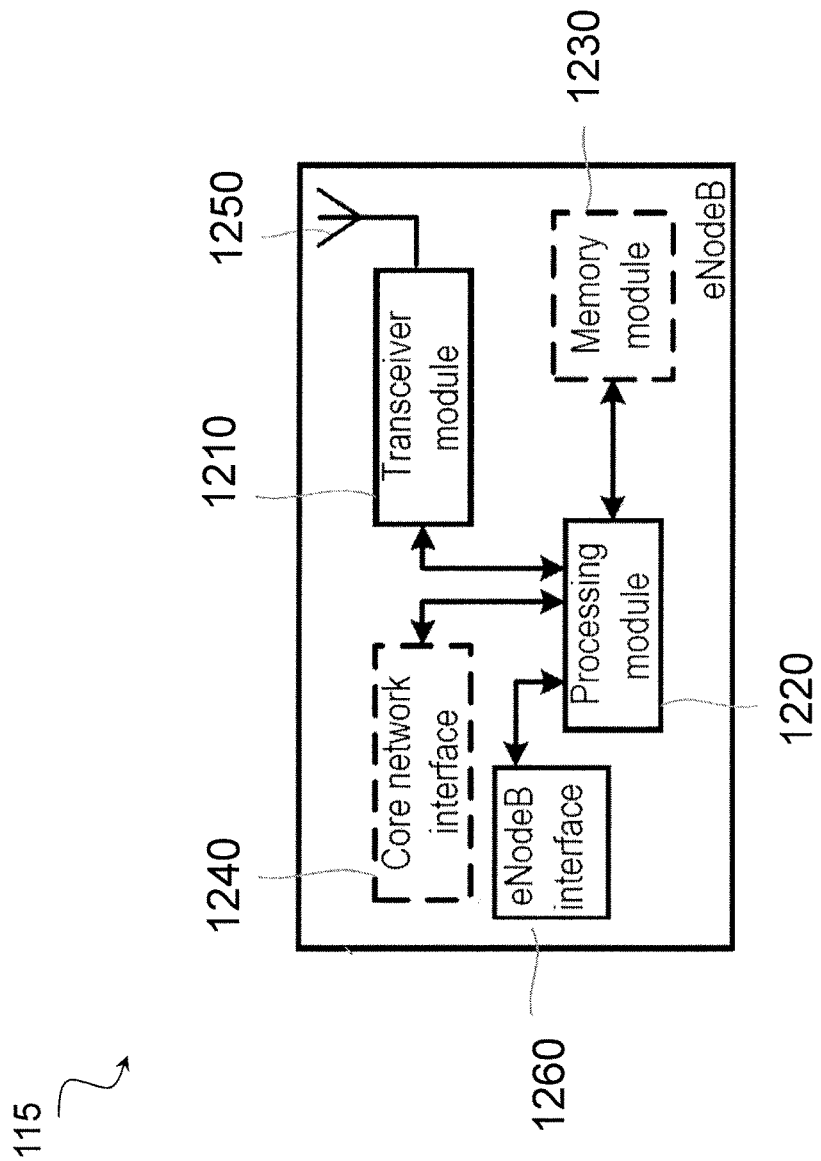
FIG. 12 is a block schematic of an exemplary radio network node suitably operative in accordance with certain embodiments.

FIG. 12 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout a network as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1210, processor 1220, memory 1230, and network interface 1240. Processor 1220 may also be referred to as processing module 1220. Processing module 1220 controls the operation of network node 115, and may execute instructions to provide some or all of the functionality described above as being provided by a network node 115. The processing module 1220 is connected to a transceiver module 1210 with associated antenna(s) 1250 which are used to transmit signals to, and receive signals from, wireless devices 110 in the network 100. Network node 115 also comprises a memory module 1230 that is connected to the processing module 1220 and that stores program and other information and data required for the operation of network node 115. For example, memory 1230 may store the instructions executed by processor 1220. Network node 115 also includes components and/or circuitry 1260 for allowing network node 115 to exchange information with other network nodes 115 (for example via an X2 interface) and components and/or circuitry 1240 for allowing the base station 10 to exchange information with nodes in the core network (for example via the Si interface). Network interface 1240 may communicate signals to backend network components, such as a gateway, switch, router, Internet, Public Switched Telephone Network (PSTN), core network nodes, radio network controllers, etc. It will be appreciated that network nodes for use in other types of network (e.g. UTRAN or WCDMA RAN) will include similar components to those shown in FIG. 12 and appropriate interface circuitry for enabling communications with the other network nodes in those types of networks (e.g. base stations, mobility management nodes and/or nodes in the core network).

Processor 1220 may include any suitable combination of hardware and software implemented in one or more modules to execute instructions and manipulate data to perform some or all of the described functions of network node 115. In some embodiments, processor 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for network node 115, send output from network node 115, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 1220 of FIG. 12. In certain embodiments, the functions of two or more of the various modules may be combined into a single module.

In general, the determining module may perform the processing function of network node 115. For example, the determining module may determine a beam forming quality indicator for the network node, and perform one or more radio tasks using the determined beam forming quality indicator. As another example, the determining module may determine the beam forming quality indicator for another network node. As yet another example, the determining module may update the determined beam forming quality indicator. As another example, the determining module may determine whether to communicate the determined beam forming quality indicator to the user equipment based at least in part on received capability information.

The communication module may perform the transmission functions of network node 115. The communication module may transmit messages to one or more of wireless devices 110 or to other network nodes. For example, the communication module may communicate the determined beam forming quality indicator to a second network node and/or to a user equipment. As another example, the communication module may communicate a request for capability information to a user equipment. As yet another example, the communication module may communicate the received capability information to one or more network nodes. The communication module may include a transmitter and/or a transceiver, such as transceiver 1210. The communication module may include circuitry configured to wirelessly transmit messages and/or signals. In particular embodiments, the communication module may receive messages and/or signals for transmission from the discovery burst module, cell ID module, or determining module.

The receiving module may perform the receiving functions of network node 115. The receiving module may receive any suitable information from a wireless device or other network node. For example, the receiving module may receive a beam forming quality indicator from a second network node. As another example, the receiving module may receive a request that the network node communicate the beam forming quality indicator to another network node. As yet another example, the receiving module may receive capability information from a user equipment. The receiving module may include a receiver and/or a transceiver. The receiving module may include circuitry configured to wirelessly receive messages and/or signals. In particular embodiments, the receiving module may communicate received messages and/or signals to the determining module.

Other embodiments of network node 115 may include additional components beyond those shown in FIG. 12 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 13:
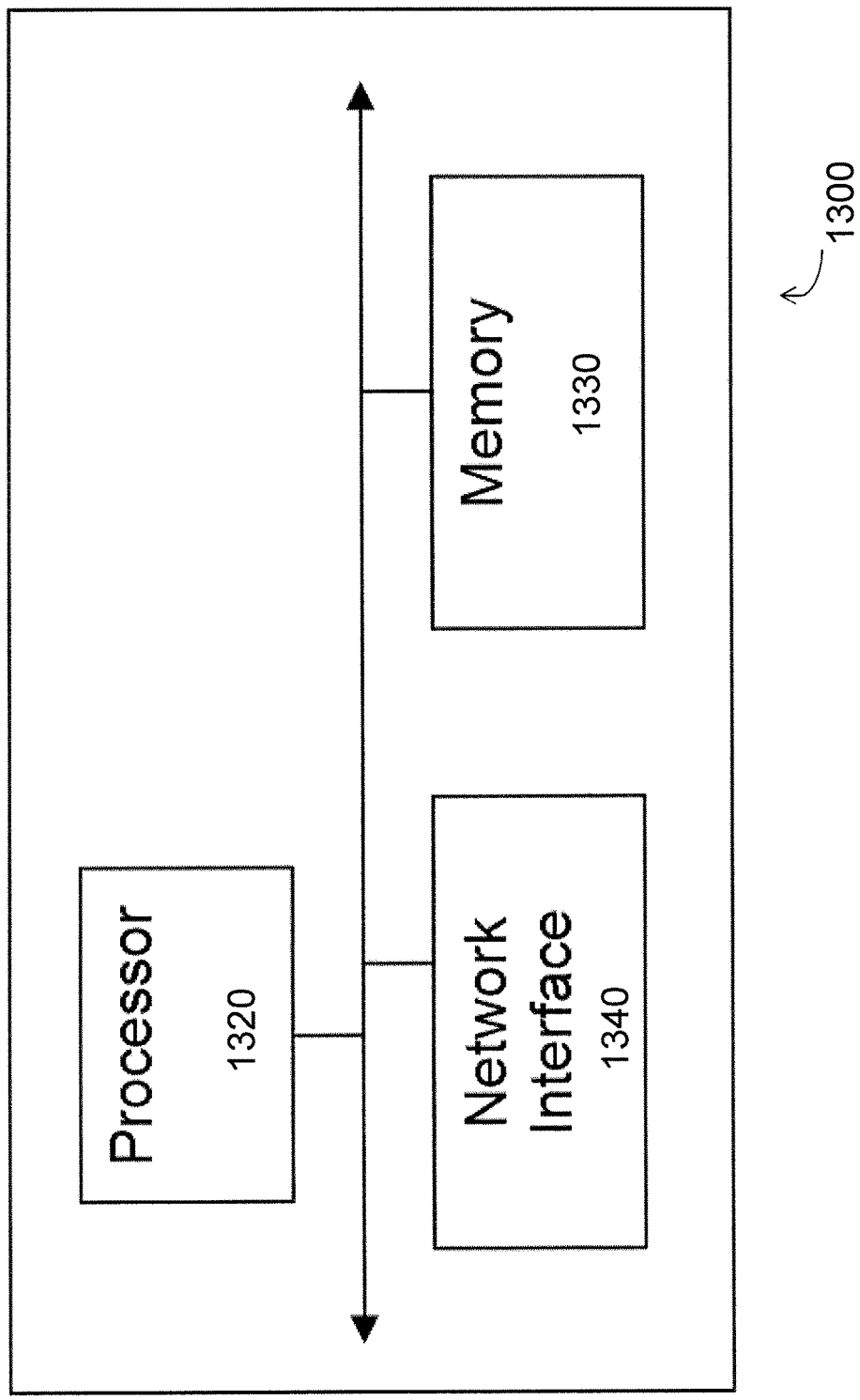
FIG. 13 is a block schematic of an exemplary core network node, in accordance with certain embodiments.

FIG. 13 is a block schematic of an exemplary radio network controller or core network node 1300, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node include processor 1320, memory 1330, and network interface 1340. In some embodiments, processor 1320 executes instructions to provide some or all of the functionality described above as being provided by the network node, memory 1330 stores the instructions executed by processor 1320, and network interface 1340 communicates signals to any suitable node, such as a gateway, switch, router, Internet, Public Switched Telephone Network (PSTN), network nodes 115, radio network controllers, core network nodes, etc.

Processor 1320 may include any suitable combination of hardware and software implemented in one or more modules to execute instructions and manipulate data to perform some or all of the described functions of the radio network controller or core network node. In some embodiments, processor 1320 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1340 is communicatively coupled to processor 1320 and may refer to any suitable device operable to receive input for the network node, send output from the network node, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in term of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AAS Active (or Adaptive) Antenna System
AE Antenna Element
BS Base station
CPICH Common Pilot Channel
CRS Common Reference Symbol
C/I Carrier to Interference ratio
DL Downlink
Ec/No Chip energy to noise ratio
HO Handover
HSPA High Speed Packet Access
ID Identity
LNA Low Noise Amplifier
LPN Low Power Node
LTE (UTRA) Long Term Evolution
PA Power Amplifier
RAT Radio Access Technology
RDN Radio Distribution Network
RF Radio Frequency
RRM Radio Resource Management
RSCP Received Signal Code Power
RSRP Reference Signal Received Power
RSRQ Reference Signal Received Quality
SINR Signal to Interference and Noise Ratio
TX Transmit
TXU Transceiver Unit
UE User Equipment
UL Uplink
WCDMA Wideband Code Division Multiple Access

The invention claimed is:

1. A method in a network node, comprising:
obtaining a beam forming quality indicator for a second network node, the beam forming quality indicator indicating a beam forming performance gain from the second network node having beam forming capability, wherein the beam forming quality indicator comprises at least or is a function of at least a reference signal quality and an achievable signal quality;
performing one or more radio operations based at least in part on the obtained beam forming quality indicator for the second network node; and
wherein the network node is serving a user equipment, and performing one or more radio operations based at least in part on the obtained beam forming quality indicator for the second network node comprises:
determining, based at least in part on the obtained beam forming quality indicator, that the second network node can provide better beam forming gain than a third network node, the third network node having a higher reference signal received quality than the second network node; and
performing cell change of the user equipment to the second network node.

2. The method of claim 1, wherein the function defining the beam forming quality indicator further comprises one or more of:
one or more multi-antenna configuration parameters;
one or more characteristics of a beam;
one or more characteristics of a radiation pattern; and
a frequency band or range of frequencies.

3. The method of claim 1, wherein obtaining the beam forming quality indicator for the second network node comprises receiving the beam forming quality indicator for the second network node from the second network node.

4. The method of claim 1, wherein obtaining the beam forming quality indicator for the second network node comprises autonomously determining the beam forming quality indicator for the second network node.

5. The method of claim 1, wherein the beam forming quality indicator is a first beam forming quality indicator, the first beam forming quality indicator corresponding to a first beam forming configuration, and the method further comprises obtaining a second beam forming quality indicator, the second beam forming quality indicator corresponding to a second beam forming configuration.

6. The method of claim 5, wherein the first beam forming configuration and the second beam forming configuration are selected from a group including beam forming in uplink, beam forming in downlink, elevation beam forming in uplink or downlink, and ground level beam forming in the uplink or downlink.

7. A network node, comprising:
one or more processors configured to:
obtain a beam forming quality indicator for a second network node, the beam forming quality indicator indicating a beam forming performance gain from the second network node having beam forming capability, wherein the beam forming quality indicator comprises at least or is a function of at least a reference signal quality and an achievable signal quality;
perform one or more radio operations based at least in part on the obtained beam forming quality indicator for the second network node; and
wherein the network node is serving a user equipment, and the one or more processors configured to perform one or more radio operations based at least in part on the obtained beam forming quality indicator for the second network node comprises one or more processors configured to:
determine, based at least in part on the obtained beam forming quality indicator, that the second network node can provide better beam forming gain than a third network node, the third network node having a higher reference signal received quality than the second network node; and
perform cell change of the user equipment to the second network node.

8. The network node of claim 7, wherein the function defining the beam forming quality indicator further comprises one or more of:
one or more multi-antenna configuration parameters;
one or more characteristics of a beam;
one or more characteristics of a radiation pattern; and
a frequency band or range of frequencies.

9. The network node of claim 7, wherein the one or more processors configured to obtain the beam forming quality indicator for the second network node comprises one or more processors configured to receive the beam forming quality indicator for the second network node from the second network node.

10. The network node of claim 7, wherein the one or more processors configured to obtain the beam forming quality indicator for the second network node comprises one or more processors configured to autonomously determine the beam forming quality indicator for the second network node.

11. The network node of claim 7, wherein the beam forming quality indicator is a first beam forming quality indicator, the first beam forming quality indicator corresponding to a first beam forming configuration, and the one or more processors are further configured to obtain a second beam forming quality indicator, the second beam forming quality indicator corresponding to a second beam forming configuration.

12. The network node of claim 11, wherein the first beam forming configuration and the second beam forming configuration are selected from a group including beam forming in uplink, beam forming in downlink, elevation beam forming in uplink or downlink, and ground level beam forming in the uplink or downlink.

13. A method in a user equipment, comprising:
obtaining a beam forming quality indicator for a first network node, the beam forming quality indicator indicating a beam forming performance gain from the first network node having beam forming capability, wherein the beam forming quality indicator comprises at least or is a function of at least a reference signal quality and an achievable signal quality;
performing one or more radio operations based at least in part on the obtained beam forming quality indicator for the first network node;
wherein performing one or more radio operations based at least in part on the obtained beam forming quality indicator for the first network node comprises using the obtained beam forming quality indicator for one or more cell change procedures; and
wherein the one or more cell change procedures comprise cell reselection, and the method further comprises:
determining one or more reference signal measurements for the first network node;
modifying the one or more reference signal measurements based at least in part on the beam forming quality indicator for the first network node; and
reselecting, upon entering an area of a cell in which beam forming by the first network node would provide downlink throughput levels corresponding to a cell range extension zone, the first network node without a handover from a second network node.

14. The method of claim 13, wherein the function defining the beam forming quality indicator further comprises one or more of:
one or more multi-antenna configuration parameters;
one or more characteristics of a beam;
one or more characteristics of a radiation pattern; and
a frequency band or range of frequencies.

15. The method of claim 13, wherein performing one or more radio operations based at least in part on the obtained beam forming quality indicator for the first network node comprises modifying one or more measurement reports based at least in part on the obtained beam forming quality indicator.

16. The method of claim 13, further comprising:
determining whether the beam forming performance gain indicated by the beam forming quality indicator exceeds a threshold; and
reporting the modified measurement report to one or more network nodes upon a determination that the beam forming performance gain indicated by the beam forming quality indicator exceeds the threshold.

17. The method of claim 13, wherein the one or more cell change procedures comprise cell reselection, and the method further comprises:
determining the beam forming performance gain indicated by the beam forming quality indicator for the first network node;
selecting a cell having a beam forming performance gain above a threshold.

18. The method of claim 13, wherein the first network node is serving the user equipment, and the method further comprises:
obtaining a beam forming quality indicator for at least a second network node, the beam forming quality indicator for the second network node being larger than the beam forming quality indicator for the first network node by at least a beam forming quality indicator threshold;

determining, based at least in part on the obtained beam forming quality indicators for the first and second network nodes, that the second network node can provide better beam forming performance gain than the first network node; and performing cell change of the user equipment from the first network node to the second network node.

19. The method of claim 13, further comprising communicating capability information to one or more network nodes, the capability information including information about an ability of the user equipment to use the beam forming quality indicator for one or more radio operations.

20. A user equipment, comprising:
one or more processors configured to:
obtain a beam forming quality indicator for a first network node, the beam forming quality indicator indicating a beam forming performance gain from the first network node having beam forming capability, wherein the beam forming quality indicator comprises at least or is a function of at least a reference signal quality and an achievable signal quality;
perform one or more radio operations based at least in part on the obtained beam forming quality indicator for the first network node;
wherein the one or more processors configured to perform one or more radio operations based at least in part on the obtained beam forming quality indicator for the first network node comprises one or more processors configured to use the obtained beam forming quality indicator for one or more cell change procedures;
wherein the one or more cell change procedures comprise cell reselection, and the one or more processors are further configured to:
determine one or more reference signal measurements for the first network node;
modify the one or more reference signal measurements based at least in part on the beam forming quality indicator for the first network node;
reselect, upon entering an area of a cell in which beam forming by the first network node would provide downlink throughput levels corresponding to a cell range extension zone, the first network node without a handover from a second network node.

21. The user equipment of claim 20, wherein the function defining the beam forming quality indicator further comprises one or more of:
one or more multi-antenna configuration parameters;
one or more characteristics of a beam;
one or more characteristics of a radiation pattern; and
a frequency band or range of frequencies.

22. The user equipment of claim 20, wherein the one or more processors configured to perform one or more radio operations based at least in part on the obtained beam forming quality indicator for the first network node comprises one or more processors configured to modify one or more measurement reports based at least in part on the obtained beam forming quality indicator.

23. The user equipment of claim 20, wherein the one or more processors are further configured to:
determine whether the beam forming performance gain indicated by the beam forming quality indicator exceeds a threshold; and
report the modified measurement report to one or more network nodes upon a determination that the beam forming performance gain indicated by the beam forming quality indicator exceeds the threshold.

24. The user equipment of claim 20, wherein the one or more cell change procedures comprise cell reselection, and the one or more processors are further configured to:
determine the beam forming performance gain indicated by the beam forming quality indicator for the first network node;
select a cell having a beam forming performance gain above a threshold.

25. The user equipment of claim 20, wherein the first network node is serving the user equipment, and the one or more processors are further configured to:
obtain a beam forming quality indicator for at least a second network node, the beam forming quality indicator for the second network node being larger than the beam forming quality indicator for the first network node by at least a beam forming quality indicator threshold;
determine, based at least in part on the obtained beam forming quality indicators for the first and second network nodes, that the second network node can provide better beam forming performance gain than the first network node; and
perform cell change of the user equipment from the first network node to the second network node.

26. The user equipment of claim 20, wherein the one or more processors are further configured to communicate capability information to one or more network nodes, the capability information including information about an ability of the user equipment to use the beam forming quality indicator for one or more radio operations.

* * * * *